(12) United States Patent
Tsukamoto et al.

(10) Patent No.: US 8,094,222 B2
(45) Date of Patent: Jan. 10, 2012

(54) DRIVING METHOD FOR SOLID-STATE IMAGING DEVICE AND SOLID-STATE IMAGING DEVICE

(75) Inventors: Akira Tsukamoto, Osaka (JP); Akiyoshi Kohno, Kanagawa (JP)

(73) Assignee: Panasonic Corporation, Osaka (JP)

( * ) Notice: Subject to any disclaimer, the term of this patent is extended or adjusted under 35 U.S.C. 154(b) by 400 days.

(21) Appl. No.: 12/427,162

(22) Filed: Apr. 21, 2009

(65) Prior Publication Data
US 2009/0268068 A1 Oct. 29, 2009

(30) Foreign Application Priority Data
Apr. 25, 2008 (JP) .................. 2008-115819

(51) Int. Cl.
*H04N 5/335* (2006.01)
*H04N 7/18* (2006.01)
*G06K 9/40* (2006.01)

(52) U.S. Cl. ........ 348/296; 348/130; 348/161; 348/239; 348/241; 348/243; 348/272; 348/274; 348/294; 382/260; 382/278; 382/286; 382/312

(58) Field of Classification Search .................. 348/129, 348/130, 161, 239, 241, 243, 272–274, 294, 348/296; 382/260, 278, 286, 312
See application file for complete search history.

(56) References Cited

U.S. PATENT DOCUMENTS 4,728,803 A * 3/1988 Catchpole et al. ............ 358/465
5,270,531 A 12/1993 Yonemoto
2001/0028392 A1 10/2001 Yamamoto et al.
2009/0033780 A1 2/2009 Murata et al.
2009/0033782 A1 2/2009 Muroshima et al.
2009/0059047 A1 3/2009 Murata et al.
2009/0066825 A1 3/2009 Nezaki et al.
2009/0079857 A1 3/2009 Kato et al.

FOREIGN PATENT DOCUMENTS

JP 2005-62993 3/2005
JP 2007-28338 2/2007

OTHER PUBLICATIONS

English language Abstract of JP 2005-62993, Mar. 10, 2005.
English language Abstract of JP 2007-28338, Feb. 1, 2007.

* cited by examiner

*Primary Examiner* — Evelyn A. Lester
(74) *Attorney, Agent, or Firm* — Greenblum & Bernstein, P.L.C.

(57) ABSTRACT

A driving method used for a solid-state imaging device according to the present invention includes: imaging an object for a first storage time when a shutter is open, in a first state that is a state where either at least a part of the peripheral circuitry is suspended or a consumption current of the peripheral circuitry is limited; imaging, in the first state, a dark output signal image including only a dark output for a second storage time when the shutter is closed; converting the dark output signal image to correspond to the image obtained for the first storage time and subtracting, from the signal image of the object, the converted dark output signal image or converting the dark output signal image to correspond to the image obtained for the second storage time and subtracting, from the signal image of the object, the converted dark output signal image.

17 Claims, 24 Drawing Sheets

Distance from peripheral circuit to photodiode $X(\mu m)$

FIG. 8
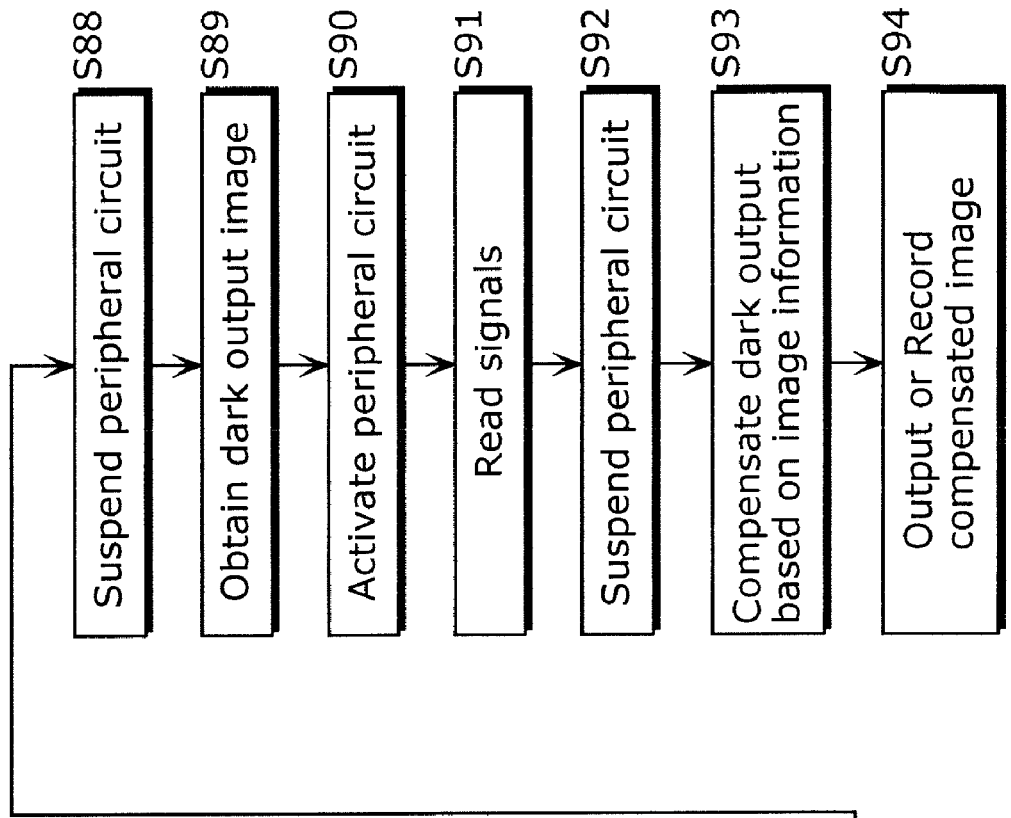
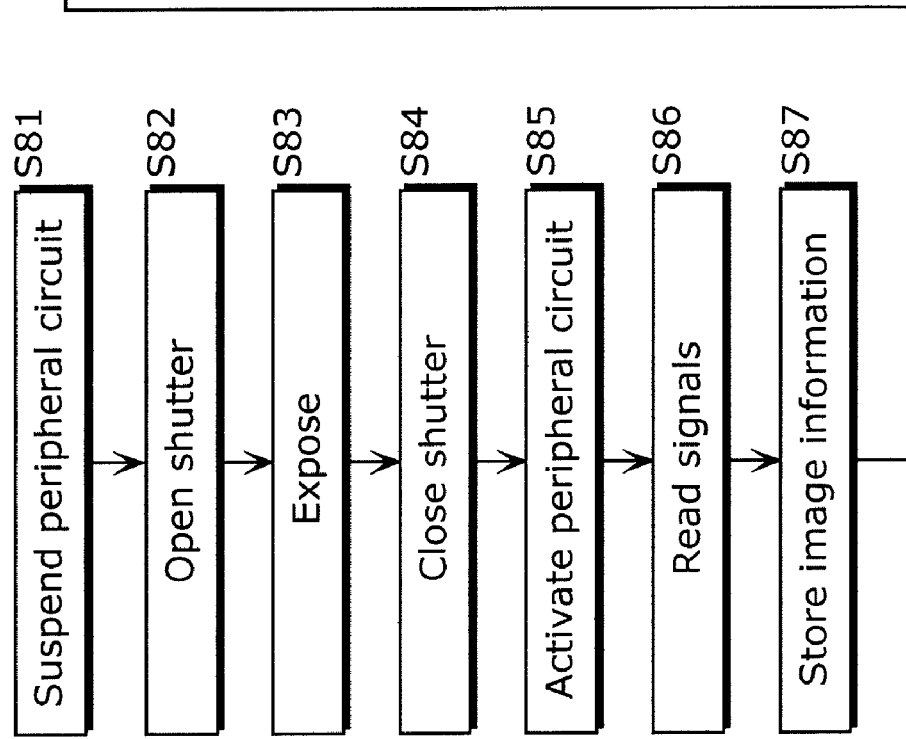

DRIVING METHOD FOR SOLID-STATE IMAGING DEVICE AND SOLID-STATE IMAGING DEVICE

BACKGROUND OF THE INVENTION (1) Field of the Invention

The present invention relates to a driving method for solid-state imaging device and a solid-state imaging device that improve fidelity of imaging and a signal processing time through noise reduction caused by a dark signal generated in a peripheral circuitry.

(2) Description of the Related Art

CCDs and MOS image sensors are generally used as solid-state image sensors in digital cameras, video cameras, and the like. The solid-state image sensors have been improved in recent years, and high-resolution solid-state image sensors have come to allow high-definition images to be imaged.

That dark currents caused by crystal defects in pixels are a factor for reducing the quality of the imaged images is known as the characteristics of the aforementioned solid-state image sensors.

Although dark outputs of the solid-state image sensors have been reduced, when imaging through long exposure exceeding several seconds to several tens of seconds, the dark outputs of the solid-state image sensors not only increase noise but also negatively influence color reproduction through signal processing. As a result, a problem emerges that the fidelity of the imaged images is decreased. The following conventional techniques have been disclosed as compensation methods for such image deterioration.

In Japanese Unexamined Patent Application Publication No. 2005-62993 (Patent Reference 1), since dark currents increase and decrease with a sensor temperature and a signal accumulation time, an image including only dark output components is obtained by performing a storage operation for a period of time with the whole solid-state image sensors shielded from light, immediately before or after actual imaging, and the dark output components are subtracted from an actual imaging signal on a pixel basis, the period of time being equal to the time spent for the actual imaging. This can reduce deterioration in image quality due to fixed pattern noise caused by dark outputs including a portion of change in the temperature and a portion of the accumulation time (compensation through actual dark subtraction).

Although this method is a very effective compensation method for image deterioration caused by the dark outputs, as the generation of the dark outputs temporarily fluctuates in principle, it is impossible to separately obtain dark output components that are completely the same as the dark output components at the time of imaging. Thus, compensating the dark outputs from image information inevitably causes compensation errors. Therefore, even when performing the compensation is assumed, it is desirable to suppress the generation of the dark outputs at the time of imaging as much as possible. In order to reduce the compensation errors as much as possible, it is necessary to perform the compensation only in the case where a size of the dark output components is larger than a given size and to reduce the temporal fluctuation by spending more than a given period of time in obtaining the dark output components. Furthermore, when conditions such as a temperature of the solid-state image sensor are different from those at the time of imaging, there is a chance that dark output components different from those at the time of imaging are obtained. In fact, although performing the accumulation operation for the period of time equal to the time spent for the actual imaging right after the actual imaging is common as a method of obtaining dark output components of an image, this has been an obstacle to camera operability because an effective imaging time becomes longer.

In Japanese Unexamined Patent Application Publication No. 2007-28338 (Patent Reference 2), dark outputs of a solid-state image sensor that result from a peripheral circuitry included in the solid-state image sensor are to be solved. Since, in comparison with thermal dark outputs generated from the pixels of a solid-state image sensor, the dark outputs of the solid-state image sensor due to the peripheral circuitry have the large maximum level in the solid-state image sensor, the dark outputs of the solid-state image sensor significantly deteriorate a dynamic range in the solid-state image sensor in which an amount of signal saturation is limited. Patent Reference 2 discloses a technique of preventing, through prohibition of imaging, or alerting a person imaging to, the deterioration in image quality such as the deterioration of the dynamic range from occurring by compensating the fixed pattern noise due to the dark outputs, by detecting nonuniformity in an imaging region of the dark outputs in the case where locally strong dark outputs are generated in the proximity of the peripheral circuitry in the imaging region of the solid-state image sensor.

SUMMARY OF THE INVENTION

The conventional technique disclosed in Patent Reference 1 is a method of compensating an image in consideration of variations in dark outputs due to a change in temperature before and after imaging, by storing an image including only dark output components immediately before and after imaging exposure and by obtaining, through a complementary operation on the dark output components, the image including only the dark output components corresponding to those at the time of the imaging exposure. Even this method does not differ from the conventional methods in that the compensation is performed by subtracting, from an imaged image, dark signals predicted to be generated in an approximate imaging exposure time, and there is a problem that a dynamic range of the image obtained by subtracting the dark signals deteriorates with respect to an original dynamic range of a solid-state image sensor since the dark outputs increase in direct proportion to the exposure time.

Although the conventional technique disclosed in Patent Reference 2 produces an advantageous effect that a person imaging recognizes deterioration in image quality in advance, the conventional technique has a problem that technical features for substantial image quality improvement such as a dynamic range are not provided.

Furthermore, locally strong dark outputs generated due to the influence of peripheral circuitry are caused mainly by photodiodes of a solid-state image sensor that receive light emitted by hot carriers generated in a MOS transistor of the peripheral circuitry rather than by temperature nonuniformity of the solid-state image sensor due to the operation of the peripheral circuitry.

It is known that, in a MOS transistor, when a difference in potential between a source and a drain becomes large, a strong local electric field is generated in the proximity of the drain, so that an avalanche (avalanche phenomenon) occurs, and many drain avalanche hot carriers (DAHCs) having high energy are generated. The hot carriers generated in the above manner excites electronic charges of substrate crystals (normally Si), and photons are generated when the electronic charges fall into a trajectory. This phenomenon can be observed on the surface of the MOS transistor using a photomultiplier tube in the case where the generation density of photon is high. As the solid-state image sensor is sensitive to capture several photons as signals, the solid-state image sensor occasionally detects, as dark outputs, a small number of low-density photons due to the DAHCs in the case where a circuit area is larger than a certain size.

FIG. 20 is a diagram showing a configuration of a conventional a solid-state imaging device. The solid-state imaging device includes: a driving circuit that drives a solid-state image sensor; a timing generating circuit that controls a driving timing; a shutter whose opening and closing is controlled by the timing generation circuit; an AD converter that digitally converts output signals of the solid-state image sensor; a storage device that temporarily stores a converted image; a computational device that performs compensation through a comparison operation on the stored image and dark output signals; and an output or recording device that outputs or records the compensated image.

FIG. 21 is a diagram showing a simplified conventional driving method for solid-state imaging device. The shutter is opened, and an image is imaged by exposure. The shutter is closed, and image information is stored in the storage device. A dark output image is obtained by causing the solid-state image sensor to perform an exposure operation again with the shutter closed. Compensation is performed by comparing the stored image information and the dark output image, and the compensated image is outputted or recorded.

FIG. 22 is a diagram schematically showing a configuration of a solid-state image sensor. A CCD solid-state image sensor 5 includes an imaging region 1, an output amplifier 2, a substrate voltage generation circuit 3, and a horizontal CCD 4. In this example, besides pixels having high dark outputs of a dark output image to be outputted from the CCD solid-state image sensor 1 are distributed around the output amplifier 2, dark outputs of the dark output image around the substrate voltage generation circuit 3 also become higher than the periphery of the substrate voltage generation circuit 3.

FIG. 23 is a diagram schematically showing a configuration of a solid-state image sensor. A MOS solid-state image sensor 11 includes a imaging region 6, a column amplifier 7, AD conversion and signal processing circuit 8, vertical shift registers 9a and 9b, and a horizontal shift register 10. In an example of the MOS solid-state image sensor 11 shown in FIG. 23, dark outputs of a dark output image to be outputted in a light-shielded state become higher in the proximity of the column amplifier 7, the AD conversion and signal processing circuit 8, the horizontal shift register 10, and the vertical shift registers 9a and 9b.

The dark outputs in FIGS. 22 and 23 may reach approximately 10% of an amount of signal saturation of a solid-state image sensor in long-time exposure.

FIG. 24 is a graph showing a change in an amount of signal in the case where dark outputs are compensated with a conventional driving method for solid-state imaging device.

When Patent Reference 1 is used, a problem occurs that since dark signals generated due to the peripheral circuitry such as the output amplifier 2, the substrate voltage generation circuit 3, and the column amplifier 7 are high, an amount of signal saturation of the image obtained through the compensation is significantly reduced with respect to an amount of signal saturation of a solid-state image sensor.

In addition, when Patent Reference 2 is used, there is a problem that as large dark outputs are locally generated due to the peripheral circuitry, imaging is prohibited in fear of the deterioration in image quality caused by the driving method for solid-state imaging device described in Patent Reference 1.

In view of the above problems, the present invention provides a driving method for solid-state imaging device and a solid-state imaging device that are used for improving imaging fidelity and a signal processing time by reducing noise due to dark signals generated in the peripheral circuitry.

In order to solve the above problems, a driving method for use in a solid-state imaging device according to the present inventions is a driving method for use in a solid-state imaging device which includes a solid-state image sensor including an imaging region and a peripheral circuitry arranged around the imaging region, and which includes: imaging an object for a first storage time in a period when a shutter is open, in a first state that is a state where either at least a part of the peripheral circuitry is suspended or a consumption current of the peripheral circuitry is limited; reading a signal image of the imaged object in a second state that is a state where the peripheral circuitry is not suspended and the consumption current is not limited; imaging, in the first state, a dark output signal image including only a dark output for a second storage time in a period when the shutter is closed; reading the imaged dark output signal image in the second state; and converting the dark output signal image to correspond to the image obtained for the first storage time and subtracting, from the signal image of the object, the converted dark output signal image or converting the dark output signal image to correspond to the image obtained for the second storage time and subtracting, from the signal image of the object, the converted dark output signal image. As this configuration suppresses dark outputs generated in the peripheral circuitry at the time of imaging the object and dark outputs due to emission of light by especially DAHCs, an amount of compensation of the dark outputs is less than before. Thus, it is possible to reduce deterioration in image quality caused by the compensation of the dark outputs due to the peripheral circuitry.

Furthermore, the driving method for use in the solid-state imaging device is a driving method for use in a solid-state imaging device which includes a solid-state image sensor including an imaging region and a peripheral circuitry arranged around the imaging region, and which may include: imaging a first dark output signal image including only a dark output for a first storage time in a period when a shutter is closed, in a first state that is a state where either at least a part of the peripheral circuitry is suspended or a consumption current of the peripheral circuitry is limited; reading the imaged first dark output signal image in a second state that is a state where the peripheral circuitry is not suspended and the consumption current is not limited; reading, in the second state, a second dark output signal image that includes only a dark output and is imaged for a second storage time in a period when the shutter is closed; generating a third dark output signal image by converting the first dark output signal image to correspond to the second dark output signal image obtained for the second storage time and by subtracting, from the second dark output signal image, the converted the first dark output signal image; imaging, in the second state, an object for a third storage time in a period when the shutter is open, and reading a signal image of the object; and converting the third dark output signal image to correspond to the signal image obtained for the third storage time, and subtracting, from the signal image of the object, the converted third dark output signal image. With this configuration, since only the dark outputs due to the DAHCs of the peripheral circuitry and having small temperature dependence can be compensated, it is possible to attempt shortening an effective imaging time (that is, elimination of an imaging-restricted period) while maintaining the certain effect of the compensation. This is because, as the third dark output signal image is an image indicating only the dark output components due to the DAHCs, the third dark output signal image can be prepared in advance before the imaging time of the object.

Here, a substrate of the solid-state image sensor may have a thickness of no more than 500 µm. With this configuration, in the case where the thickness of the substrate is no more than 500 µm at which the dark outputs due to the DAHCs increase, a compensation effect for the dark outputs due to the DAHCs can be greatly produced.

Here, the solid-state imaging device may include a temperature sensor that detects a temperature of either the solid-state image sensor or a periphery of the solid-state image sensor, and the driving method may further include determining an imaging mode for imaging the object based on the temperature detected by the temperature sensor. With this configuration, as the temperature sensor detects a temperature of the solid-state image sensor or a vicinity of the solid-state image sensor and an imaging mode suitable to the detected temperature is determined, a dynamic range can be improved through suppression of the dark outputs generated at the time of imaging.

Here, the solid-state image sensor may be a CCD solid-state image sensor, and the peripheral circuitry may be an output amplifier. With this configuration, the dark outputs due to the emission of the light by the DAHCs can be suppressed.

Here, the solid-state image sensor may be a CCD solid-state image sensor, and the peripheral circuitry may be either a substrate voltage generation circuit or a part of the substrate voltage generation circuit. With this configuration, the dark outputs due to the emission of the light by the DAHCs can be suppressed in the substrate voltage generation circuit.

Here, the solid-state image sensor may be a MOS solid-state image sensor, and the peripheral circuitry may be a column amplifier. With this configuration, the dark outputs due to the emission of the light by the DAHCs can be suppressed in the column amplifier.

Here, the solid-state image sensor may be a MOS solid-state image sensor, and the peripheral circuitry may be an AD conversion circuit. With this configuration, the dark outputs due to the emission of the light by the DAHCs can be suppressed in the AD conversion circuit.

Here, the solid-state image sensor may be a MOS solid-state image sensor, and the peripheral circuitry may be at least one of a vertical shift register and a horizontal shift register. With this configuration, the dark outputs due to the emission of the light by the DAHCs can be suppressed in at least one of the vertical shift register and the horizontal shift register.

Moreover, the solid-state imaging device according to the present invention which includes an imaging region and a peripheral circuitry around the imaging region, and which includes: a solid-state image sensor that either externally suspends at least a part of the peripheral circuitry or limits a consumption current of the peripheral circuitry; a power supply control device that controls either the suspension of the peripheral circuitry or the limiting of the consumption current; a shutter that is used for imaging with the solid-state image sensor in a light-shielded state; a timing generating circuit that synchronizes the imaging with an operation of the power supply control device and the shutter; a storage device that temporarily stores imaging information obtained through the imaging; and a computation device that performs a comparison operation on image information of at least two images, wherein the solid-state imaging device images an object for a first storage time in a period when the shutter is open, in a first state that is a state where either at least a part of the peripheral circuitry is suspended or a consumption current of the peripheral circuitry is limited; images a dark output signal image including only a dark output for a second storage time in a period when the shutter is closed, in the first state; and converts the dark output signal image to correspond to the imaged obtained for the first storage time and subtracts, from a signal image of the object, the converted dark output signal image or converts the dark output signal image to correspond to the image obtained for the second storage time, and subtracts, from a signal image of the object, the converted dark output signal image. With this configuration, similar effects as described above are produced.

Furthermore, as a camera according to the present invention includes the aforementioned solid-state imaging device, similar effects as described above are produced.

With the solid-state imaging device and the driving method thereof according to the present invention, as the dark outputs generated in the peripheral circuitry at the time of imaging the object and the dark outputs due to emission of light by especially DAHCs are suppressed, the amount of compensation of the dark outputs is less than before. Thus, it is possible to reduce deterioration in image quality caused by the compensation of the dark outputs due to the peripheral circuitry. In addition, since only the dark outputs due to the DAHCs of the peripheral circuitry and having small temperature dependence can be compensated, it is possible to attempt shortening an effective imaging time (that is, elimination of an imaging-restricted period) while maintaining the certain effect of the compensation. This is because, as the third dark output signal image is an image indicating only the dark output components due to the DAHCS, the third dark output signal image can be prepared in advance before the imaging time of the object.

FURTHER INFORMATION ABOUT TECHNICAL BACKGROUND TO THIS APPLICATION

The disclosure of Japanese Patent Application No. 2008-115819 filed on Apr. 25, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the accompanying drawings:

FIG. 8 is a diagram showing a driving method for solid-state imaging device according to Embodiment 1;

DESCRIPTION OF THE PREFERRED EMBODIMENT(S)

Embodiment 1

The following will describe a driving method for solid-state imaging device and a solid-state imaging device according to Embodiment 1 of the present invention.

Figure 1:
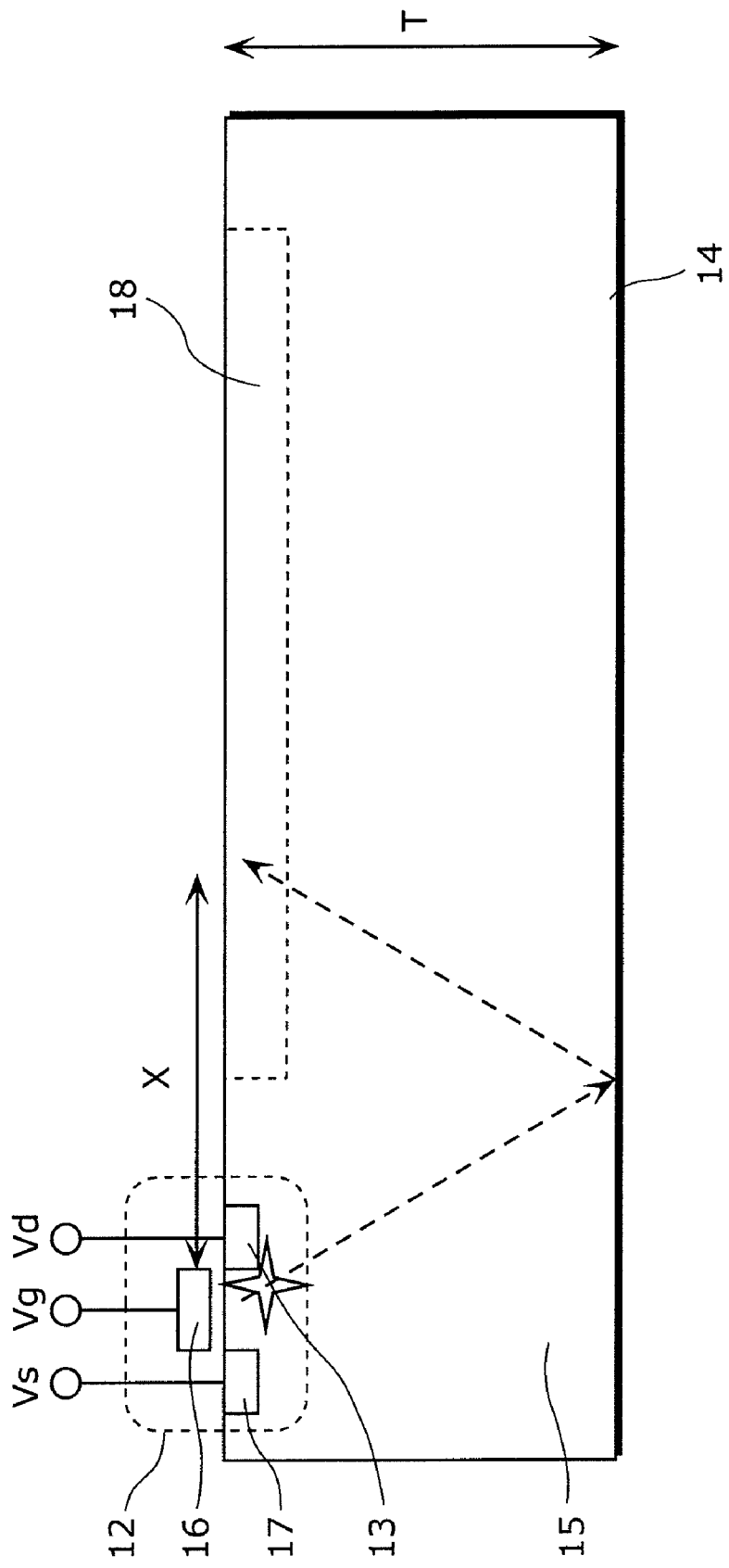
FIG. 1 is a schematic view of a section of a solid-state image sensor.

FIG. 1 is a schematic sectional diagram of a solid-state image sensor included in a solid-state imaging device. It is to be noted that in order to facilitate understanding of the present invention with FIG. 1, a peripheral circuitry (including one or more peripheral circuits) of the solid-state image sensor is represented by a single MOS transistor. In FIG. 1, a solid-state image sensor 14 includes a semiconductor substrate 15, and a peripheral circuitry 12 and an imaging region 18 that are formed on the semiconductor substrate 15; and the peripheral circuitry 12 includes a drain 13, a gate 16, and a source 17. The semiconductor substrate 15 is usually made of Si single crystal. Furthermore, T represents a thickness of the semiconductor substrate 15, and x represents a distance from the drain 13 to photodiodes. A dashed line indicates a path of photons that are generated in the proximity of the drain 13, reflect at the back side of the semiconductor substrate 15, and reach the photodiodes.

Figure 22:
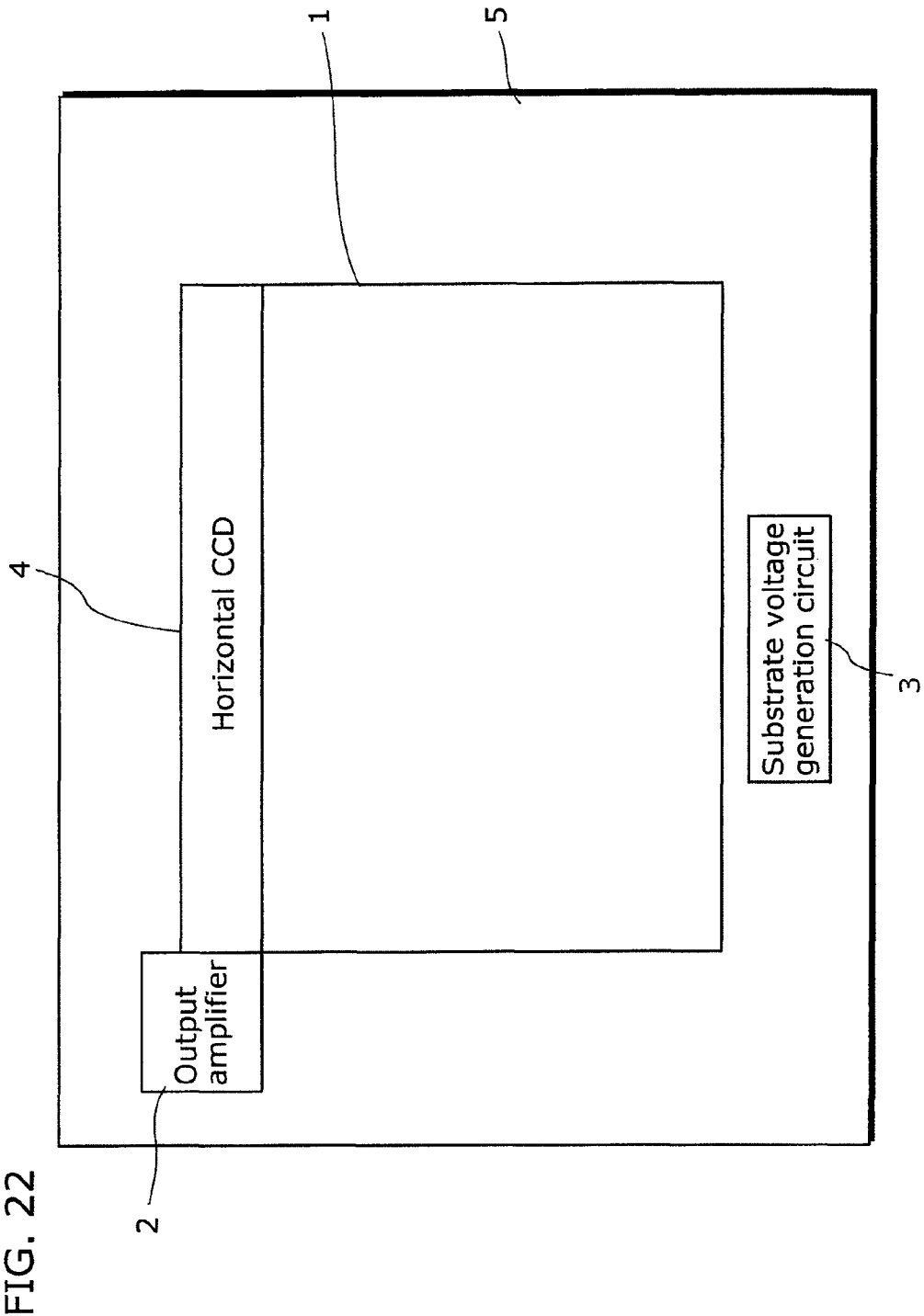
FIG. 22 is a diagram schematically showing a configuration of a conventional CCD solid-state image sensor.
Figure 23:
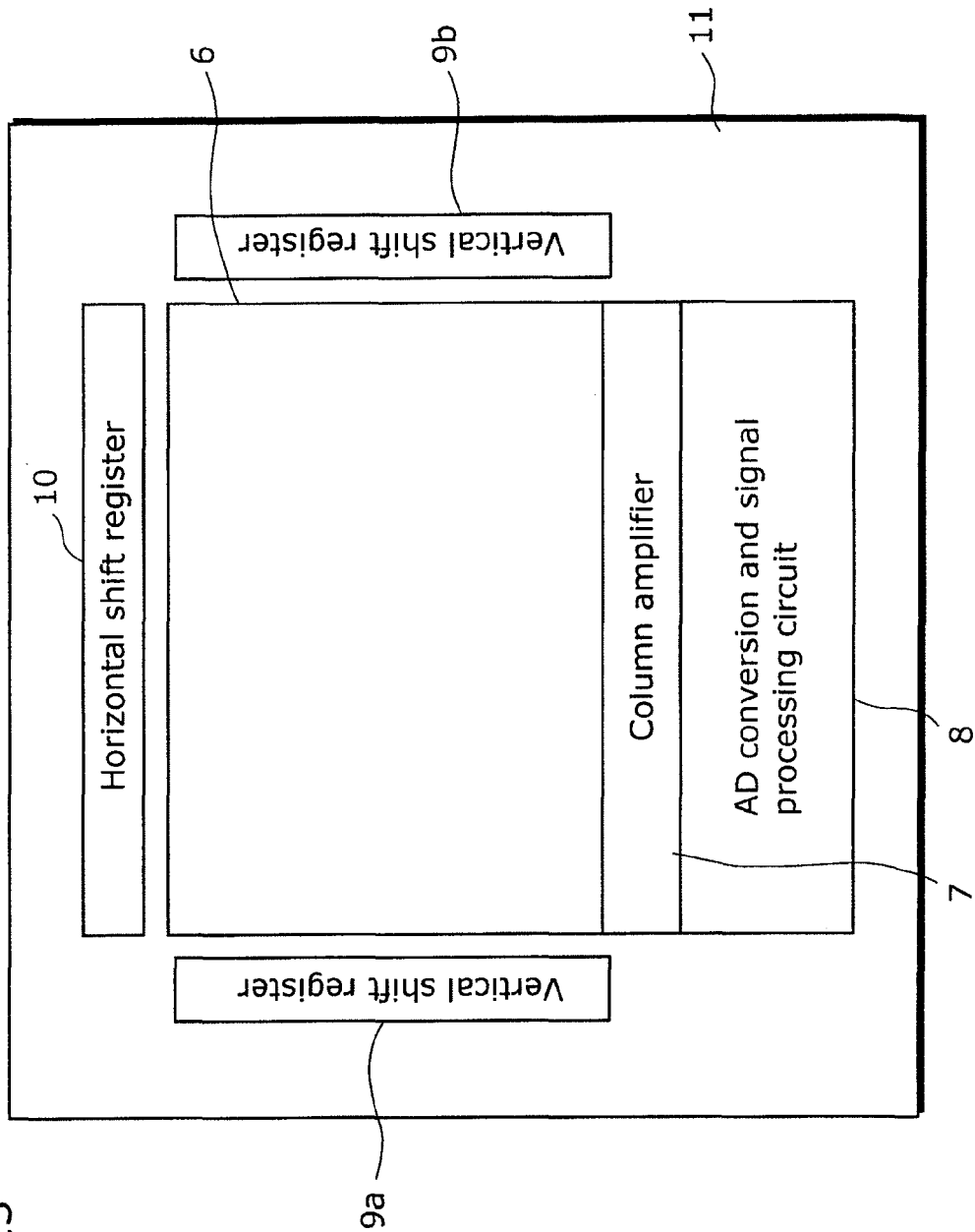
FIG. 23 is a diagram schematically showing a configuration of a conventional MOS solid-state image sensor.
Figure 24:
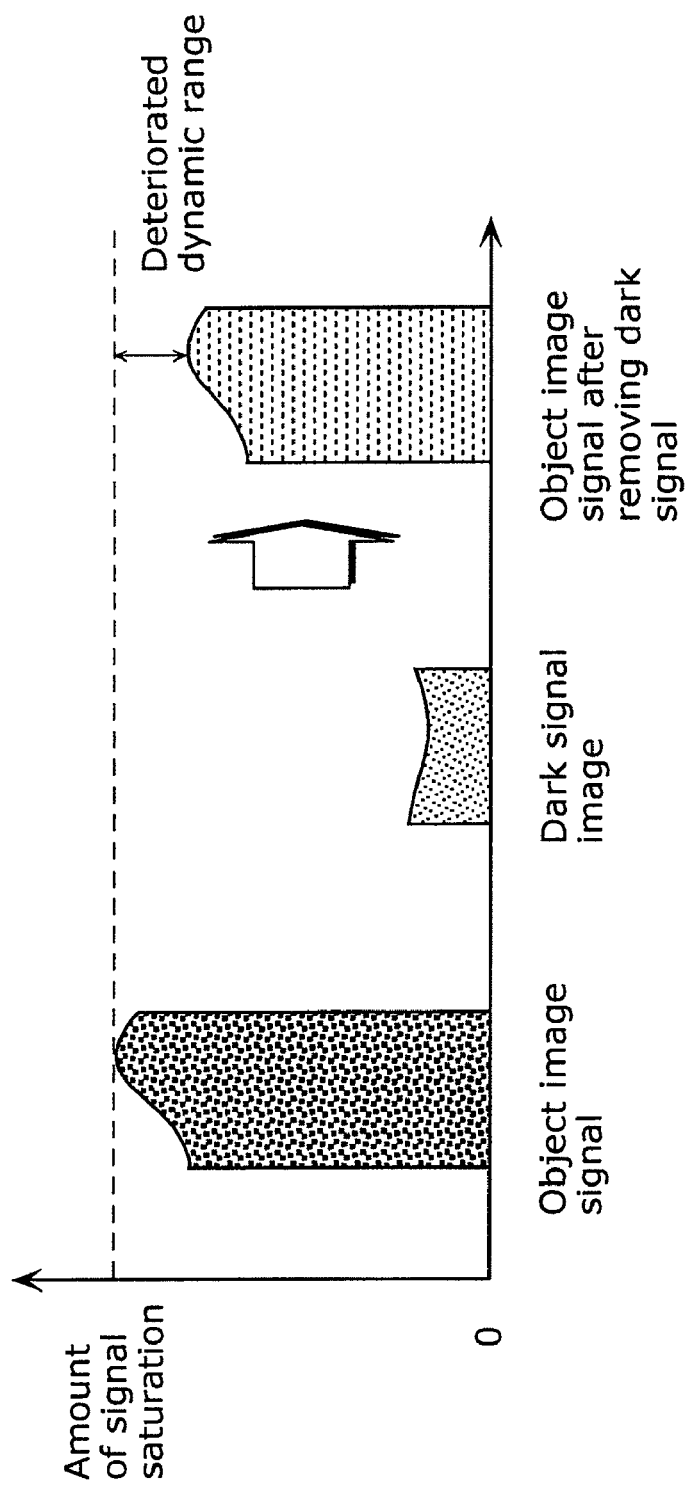
FIG. 24 is a graph showing a change in an amount of signal in the case where dark outputs are compensated with a conventional driving method for solid-state imaging device.

It is to be noted that, as shown in FIGS. 22 and 23, the increase in the dark outputs in the proximity of the peripheral circuitry such as the output amplifier 2 included in the solid-state image sensor 5, the substrate voltage generation circuit 3, and the column amplifier 7 is conventionally thought to be caused by temperature nonuniformity in a solid-state image sensor due to heat generated by the peripheral circuitry.

However, it has been found that locally strong dark outputs generated due to the influence of the peripheral circuitry are not caused by the temperature nonuniformity in the solid-state image sensor due to the operation of the peripheral circuitry, through a verification of the temperature dependence of the solid-state image sensor in a dark output distribution, a measurement of variation in time for the dark output distribution immediately after an operation is started. The main reason for the dark output distribution is that light emitted by hot carriers generated in a MOS transistor of the peripheral circuitry is received by photodiodes of a solid-state image sensor.

It is known that, in the MOS transistor, when a difference in potential between a source and a drain becomes large, a strong local electric field is generated in the proximity of the drain, so that an avalanche (avalanche phenomenon) occurs, and many carriers having high energy are generated. The carriers are called drain avalanche hot carriers (hereinafter referred to as DAHCs). The DAHCs generated in the above manner excite electronic charges of substrate crystals (normally Si), and photons are generated when the electronic charges fall into a trajectory. This phenomenon can be observed on the surface of the MOS transistor using a photomultiplier tube in the case where the generation density of photon is high. As the solid-state image sensor is sensitive to capture several photons as signals, the solid-state image sensor detects, as dark outputs, a small number of low-density photons due to the DAHCs in the case where a circuit area is larger than a certain size.

As shown in FIG. 1, where s is a path length of photons that are generated in the proximity of the drain 13, reflect at the back side of the semiconductor substrate 15, and reach the photodiodes, s can be determined by the following equation 1 using a thickness T of the semiconductor substrate 15 and a distance x from the peripheral circuitry 12 that is a source of the photons to the photodiodes.

$$s = 2\sqrt{T^2 + \left(\frac{x}{2}\right)^2} \qquad \text{[Equation 1]}$$

T is between 200 and 800 μm, and x is between 20 and 200 μm at the photodiodes in the proximity of the imaging region 18 near the peripheral circuitry 12. Thus, s, the path length of the photons, is approximately between 400 and 1000 μm, and the thickness of the semiconductor substrate 15 is dominant.

On the other hand, transmittance R with respect to optical path length s is determined by the following equation 2 using absorption coefficient α that depends on a wavelength.

$$R = \exp(-\alpha s) \qquad \text{[Equation 2]}$$

Transmittance R is synonymous with a probability that a photon generated at a place passes through a path and reaches the photodiodes.

Figure 2:
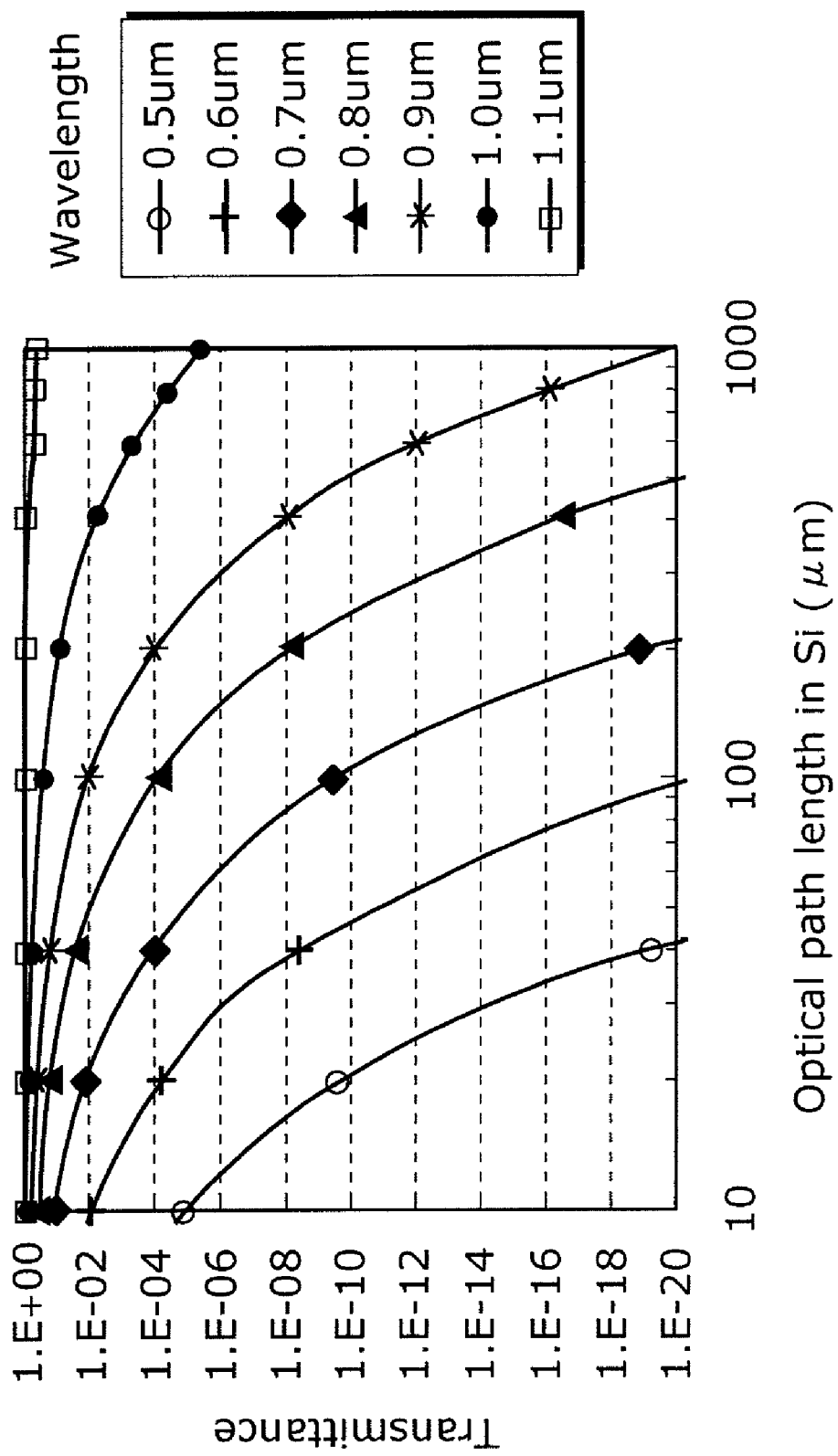
FIG. 2 is a graph showing a transmittance with respect to an optical path length in Si.

FIG. 2 is a graph showing a transmittance with respect to an optical path length in Si. In the case of a light having a wavelength of 1 μm that is equivalent to energy approximately 1.2 eV, transmittance becomes larger than approximately $1/10^5$ when a path length is no more than 1000 nm. This path length is equivalent to thickness T=approximately no more than 500 nm of the semiconductor substrate 15, and is an empirical substrate thickness with which a dark output distribution due to the peripheral circuit 12 starts to become prominent in several seconds of a signal storage time.

Figure 3:
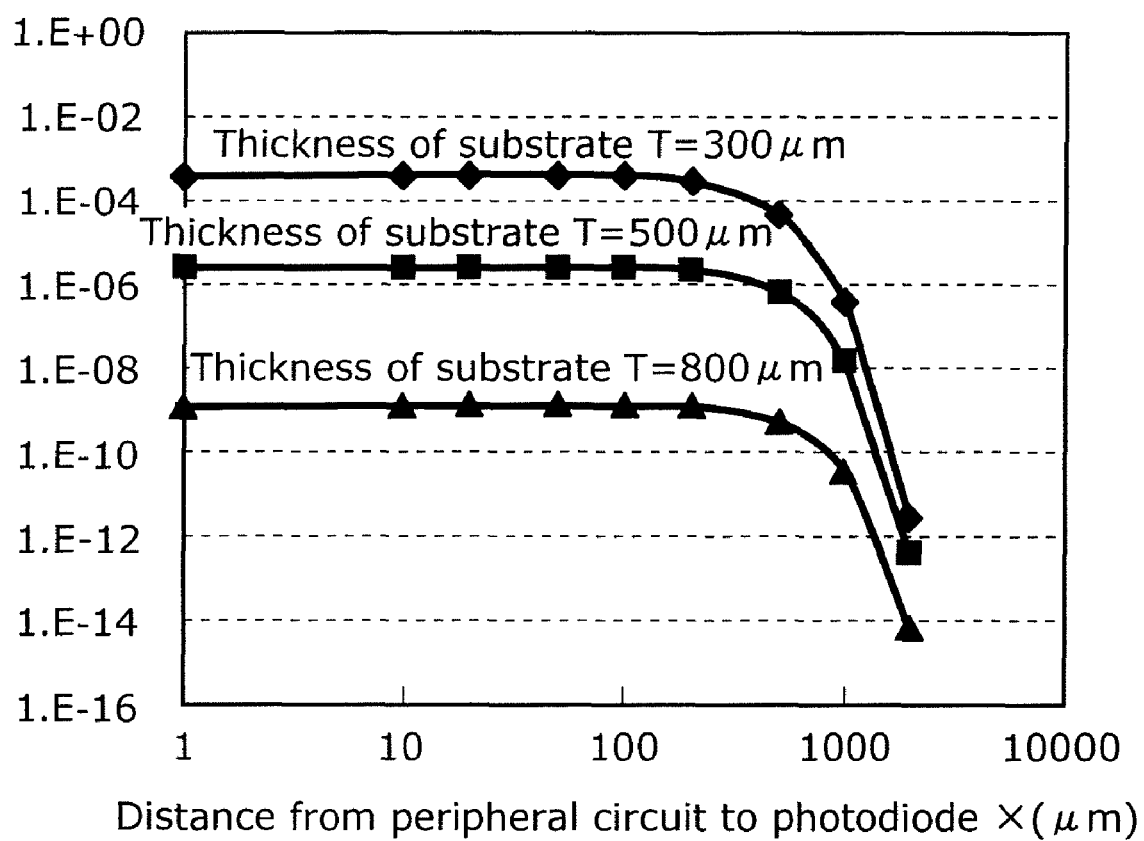
FIG. 3 is a graph showing, as a relationship of a distance from a peripheral circuitry that is a source of photons to photodiodes, a probability that a light having a wavelength of 1 µm and generated in the peripheral circuitry reflects at a back side of a substrate and reaches the photodiodes.

FIG. 3 is a graph showing, as a relationship of the distance x from the peripheral circuitry 12 that is the source of the photons and shown in FIG. 1 to the photodiodes, a probability that the light having the wavelength of 1 μm and generated in the peripheral circuitry 12 reflects at a back side of the semiconductor substrate 15 and reaches the photodiodes, the probability being determined by Equations 1 and 2. It is clear also from FIG. 3 that dark outputs heavily depend on thickness T of the semiconductor substrate 15, the dark outputs being generated by photoelectrically converting, in a photodiode region, photons that have reflected at the back side of the semiconductor substrate 15 and are caused by the DAHCs of the MOS transistor including the peripheral circuitry 12.

A thickness of a wafer silicon substrate having a diameter of 200 mm or more is usually no less than 700 μm. However, in the case where the thickness of the silicon substrate is reduced to no more than 500 nm for the purpose of mounting on a thin package, since it is obvious also from FIG. 3 that the dark outputs due to the photons generated by the DAHCs of the MOS transistor included in the peripheral circuitry 12 increase one hundred- to one thousand-fold, it is necessary to address the increase in the dark output due to the DAHCs.

Figure 4:
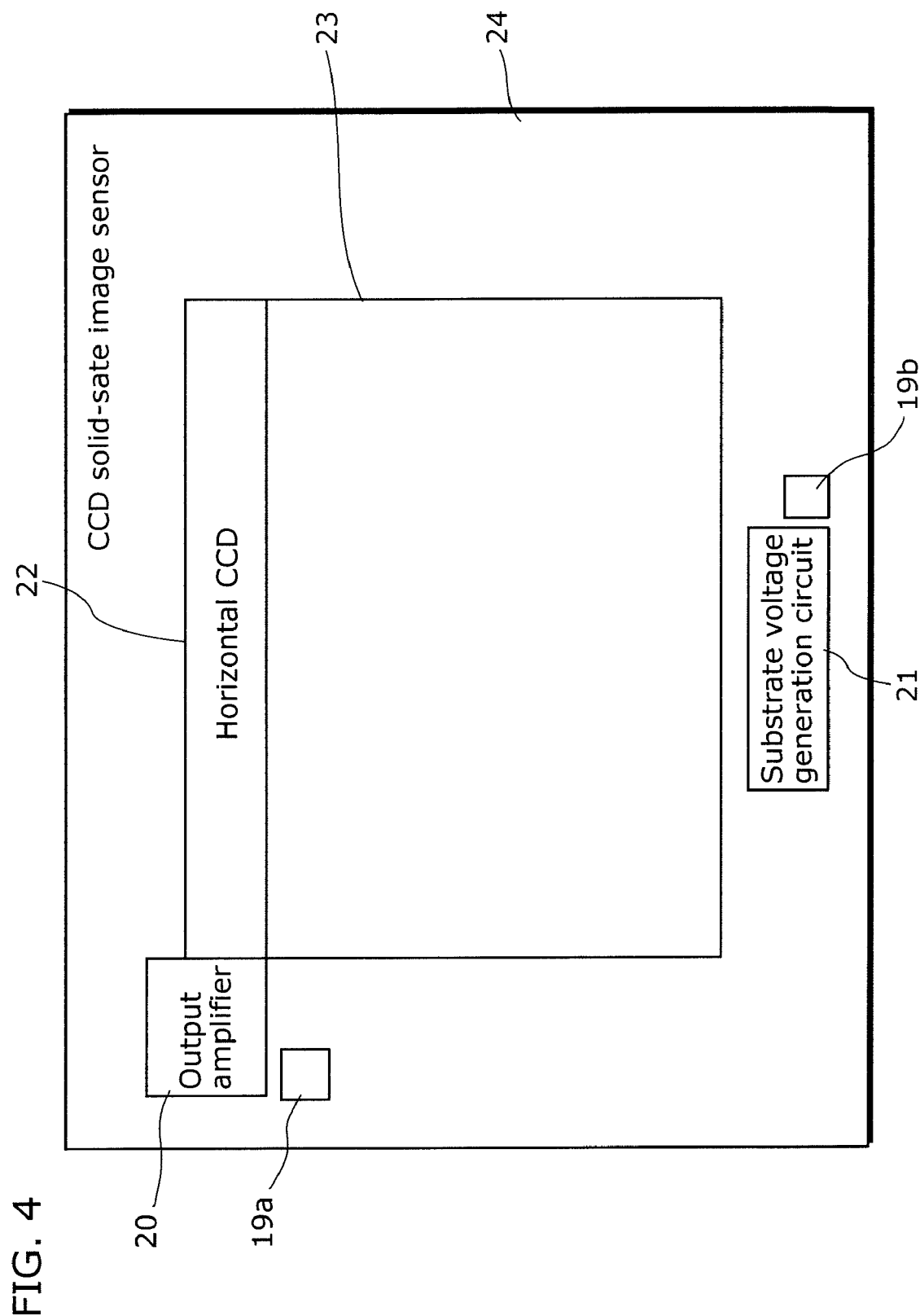
FIG. 4 is a diagram schematically showing a configuration of a CCD solid-state image sensor of the present invention.

FIG. 4 is a diagram schematically showing a configuration of a CCD solid-state image sensor of the present invention.

In FIG. 4, a CCD solid-state image sensor 24 includes control circuits 19a and 19b of a peripheral circuitry, an output amplifier 20, a substrate voltage generation circuit 21, a horizontal CCD 22, and an imaging region 23. Signals from the outside cause the control circuits 19a and 19b to suspend and active a part of the output amplifier 20 and a part of the substrate voltage generation circuit 21, respectively. Although the pixels having the high dark outputs are distributed in the proximity of the output amplifier 1 and the substrate voltage generation circuit 3 in FIG. 22, dark outputs are reduced by suspending the parts of the substrate voltage generation circuit 21 and the output amplifier 20 that are the peripheral circuitry of the CCD solid-state image sensor 24 in the present invention.

Figure 5:
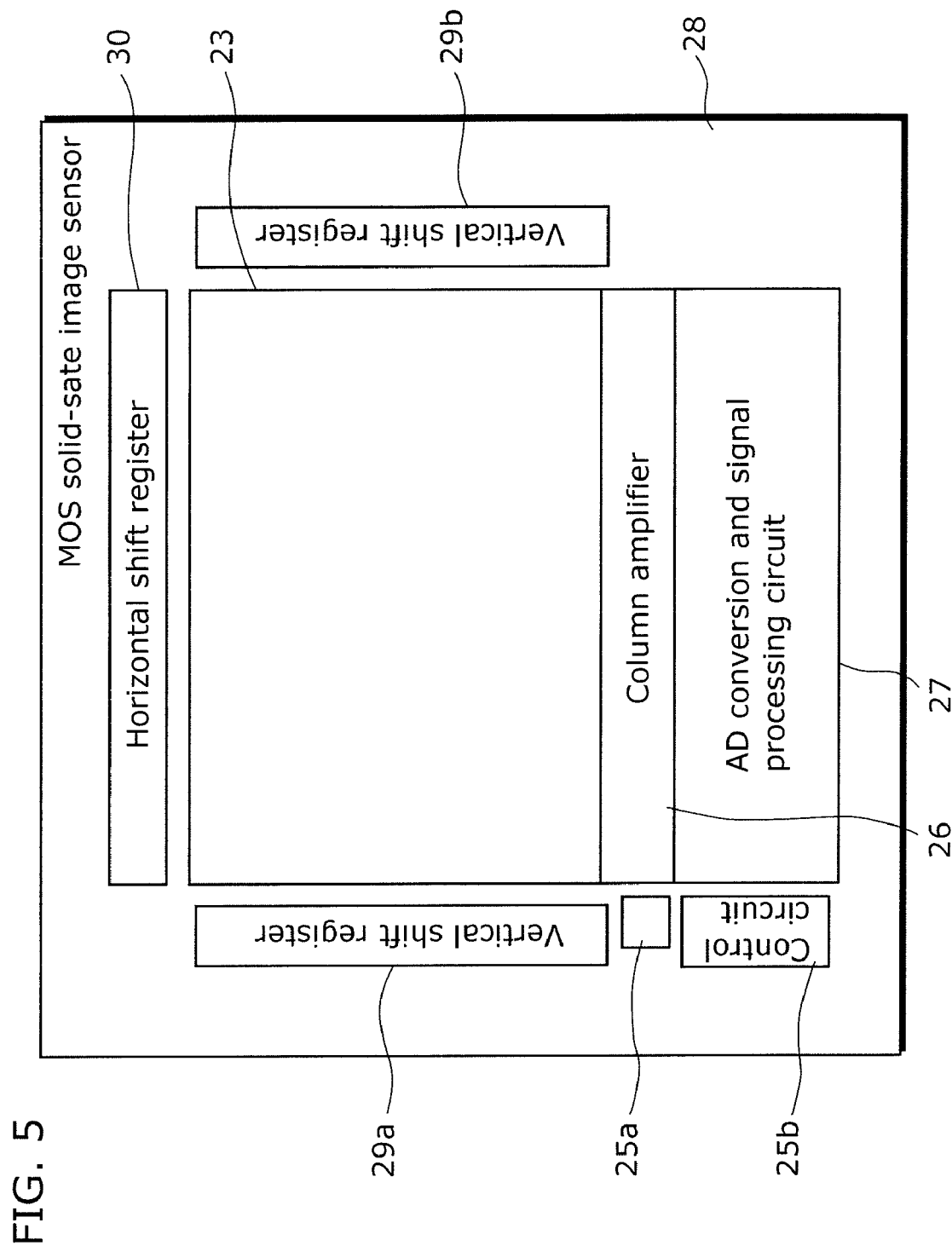
FIG. 5 is a diagram schematically showing a configuration of a MOS solid-state image sensor of the present invention.

FIG. 5 is a diagram schematically showing a configuration of a MOS solid-state image sensor of the present invention. In FIG. 5, a MOS solid-state image sensor 28 includes control circuits 25a and 25b of a peripheral circuitry, a column amplifier 26, an AD conversion and signal processing circuit 27, vertical shift registers 29a and 29b, and a horizontal shift register 30. Signals from the outside cause the control circuits 25a and 25b to suspend and active the column amplifier 26 and the AD conversion and signal processing circuit 27. Although the dark outputs in the proximity of the column amplifier 7 and the AD conversion and signal processing circuit 8 are high in FIG. 23, dark outputs are reduced by suspending, during imaging, the column amplifier 26 and the AD conversion and signal processing circuit 27 that are the peripheral circuitry of the MOS solid-state image sensor 28 in the present invention.

Figure 6:
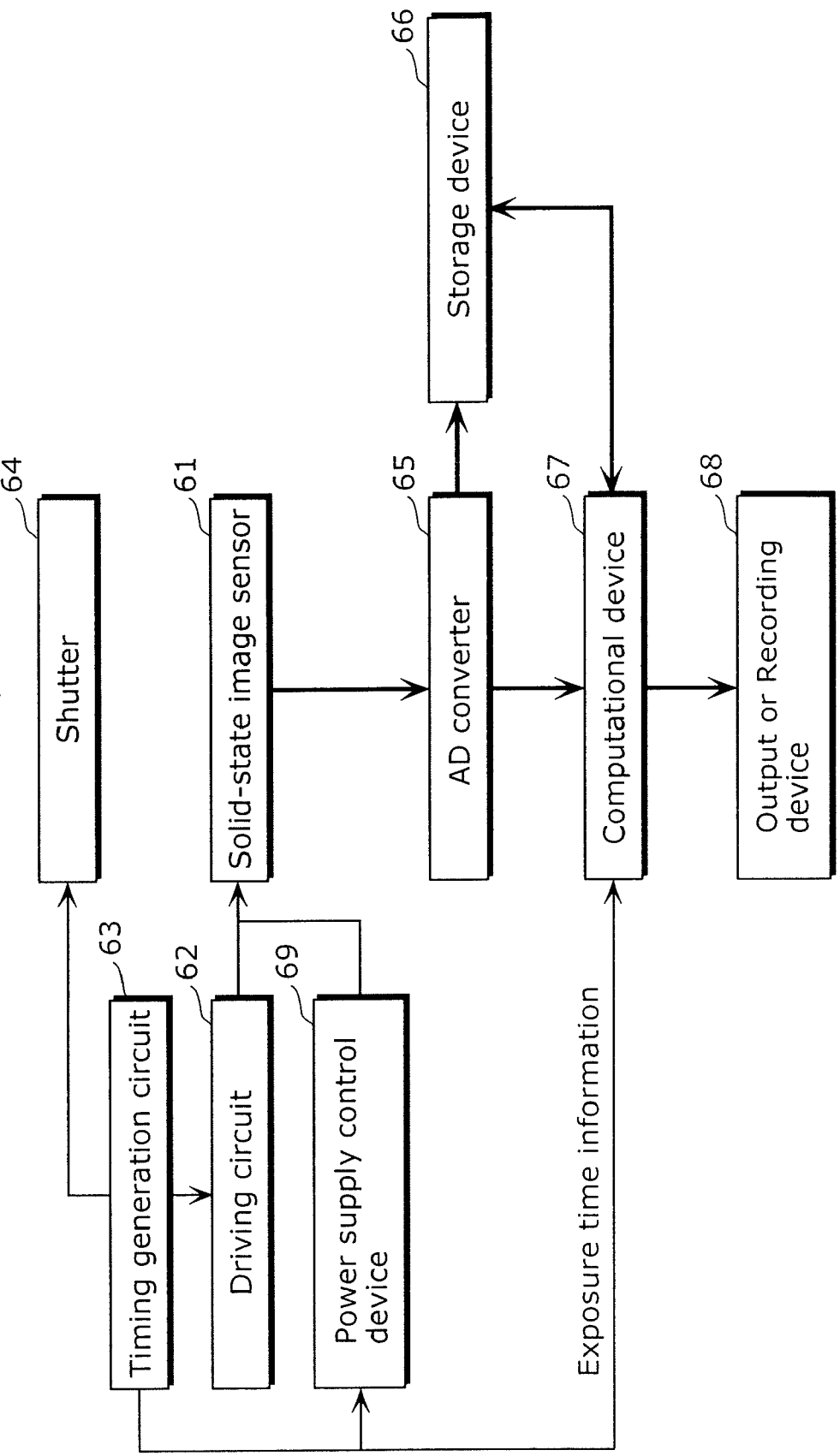
FIG. 6 is a block diagram showing a configuration of a solid-state imaging device according to Embodiment 1.

FIG. 6 is a block diagram showing a configuration of a solid-state imaging device according to Embodiment 1 of the present invention. A name of each of components is as shown in the figure.

The solid-state imaging device according to Embodiment 1 of the present invention includes: a solid-state image sensor 61; a driving circuit 62 that drives the solid-state image sensor 61; a timing generation circuit 63 that controls a driving timing; a shutter 64 whose opening and closing is controlled by the timing generation circuit 63; an AD converter that digitally converts an output signal of the solid-state image sensor 61; a storage device 66 that temporarily stores a converted image; a computational device 67 that performs compensation through a comparison operation on the stored image and a dark output signal; an output or recording device 68 that outputs or records a compensated image; and a power supply control device 69 that controls a consumption current of the solid-state image sensor 61 and the solid-state image sensor 61 that can suspend a part of the peripheral circuitry of the solid-state image sensor 61 or suppress the consumption current.

Figure 7:
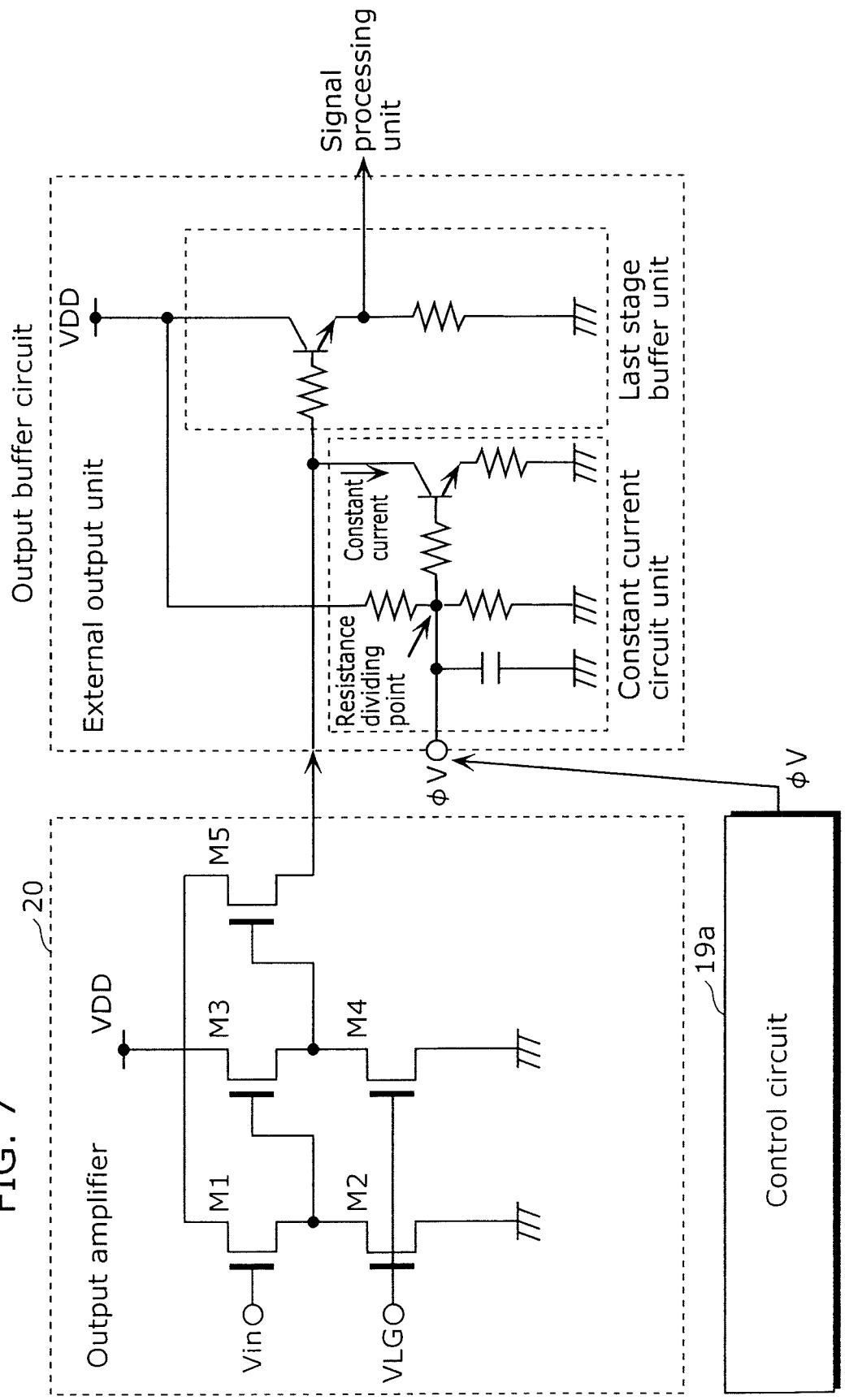
FIG. 7 is a diagram showing an output amplifier unit of a CCD solid-state image sensor modified to switch on and off a consumption current and an external emitter-follower circuit that receives a signal from the output amplifier unit.

The power supply control device 69 corresponds to the control circuits 19a and 19b of FIG. 4 and the control circuit 25a or 25b of FIG. 5. The power supply control device 69 may be provided at the inside of the solid-state image sensor as shown in FIGS. 4 and 5 or at the outside of the solid-state image sensor. FIG. 7 shows, as a specific example of such solid-state image sensor and power supply control device, an example of the output amplifier 20 and the control circuit 19a of FIG. 4.

FIG. 7 is a diagram showing the output amplifier 20 of a CCD solid-state image sensor modified to switch on and off a consumption current and an external emitter-follower circuit that receives a signal from the output amplifier 20.

The output amplifier 20 of the CCD solid-state image sensor shown in FIG. 7 is a three-stage source follower. A first-stage source follower circuit includes a driving transistor M1 and a load transistor M2 that is a source of constant currents. A second-stage source follower circuit includes a driving transistor M3 and a load transistor M4. A third-stage source follower circuit includes a driving transistor M5 and a constant-current source circuit unit that is a load circuit. The third-stage circuit consumes the largest amount of current. Accordingly, in the figure, a constant-current source circuit that is the third-stage load circuit is provided at the outside of the solid-state image sensor 24 and a transistor is added to an output buffer circuit that is an external output unit so that a current flowing to a transistor of the third-stage source follower circuit can be switched on and off with a pulse φV of the control circuit 19a. Since the output amplifier 20 of the CCD solid-state image sensor does not need to operate in an exposure period in which charges are accumulated in photodiodes, it would not matter if the power supply control circuit 69 suspends the output amplifier 20 during long exposure in which especially influence of dark outputs easily occurs.

In the case of the CCD solid-state image sensor, except a substrate voltage (Vsub) necessary for imaging, most circuits such as a circuit relevant to a vertical overflow drain operation of the substrate voltage generation circuit 21 can be suspended during signal storage (exposure).

In the case of the MOS solid-state image sensor, it would not matter if the peripheral circuitry such as the column amplifier 26 and the AD conversion and signal processing circuit 27 are suspended during the signal storage (exposure). This can suppress the dark outputs due to the DAHCs. Further, providing the constant-current source circuit unit at the outside of the solid-state imaging sensor reduces a heating value of the solid-state image sensor, thereby suppressing the dark outputs dependent on the temperature.

FIG. 8 is a diagram showing a driving method for solid-state imaging device according to Embodiment 1 of the present invention.

As will be understood from FIG. 8, the present invention is particularly effective in the case of great influence of dark outputs such as long exposure. First, a peripheral circuitry having no influence on exposure is suspended (S81). Next, a shutter is opened (S82), and the exposure of an object, that is, imaging is performed (S83). The shutter is then closed (S84). Next, the peripheral circuitry is activated again (S85), and signals obtained through the imaging are read (S86). Image information is temporarily stored in a storage device (S87). Although the image information obtained in the above manner includes relatively uniform dark outputs generated by heat, the image information does not include local dark outputs due to an operation of the peripheral circuitry. Subsequently, the peripheral circuitry having no influence on the exposure is suspended again (S88), and a dark output image is obtained in a light-shielded state. Further, the peripheral circuitry is activated (S90), and the obtained dark output image is read and stored in the storage device (S91). Here again, in order to prevent rise in temperature of the solid-state image sensor, it is desired that the peripheral circuitry is suspended until when there is a need for the peripheral circuitry (S92). Although it is desirable to obtain a dark output image for a storage time possibly equal to or longer than a storage time at the time of imaging, it is possible to compensate the dark outputs in consideration of each storage time (S93). The compensation is performed through comparison operation on the image information and the dark output image that are obtained in the above manner (S93), and the compensated image from which the dark outputs are removed is outputted or recorded (S94).

Figure 9:
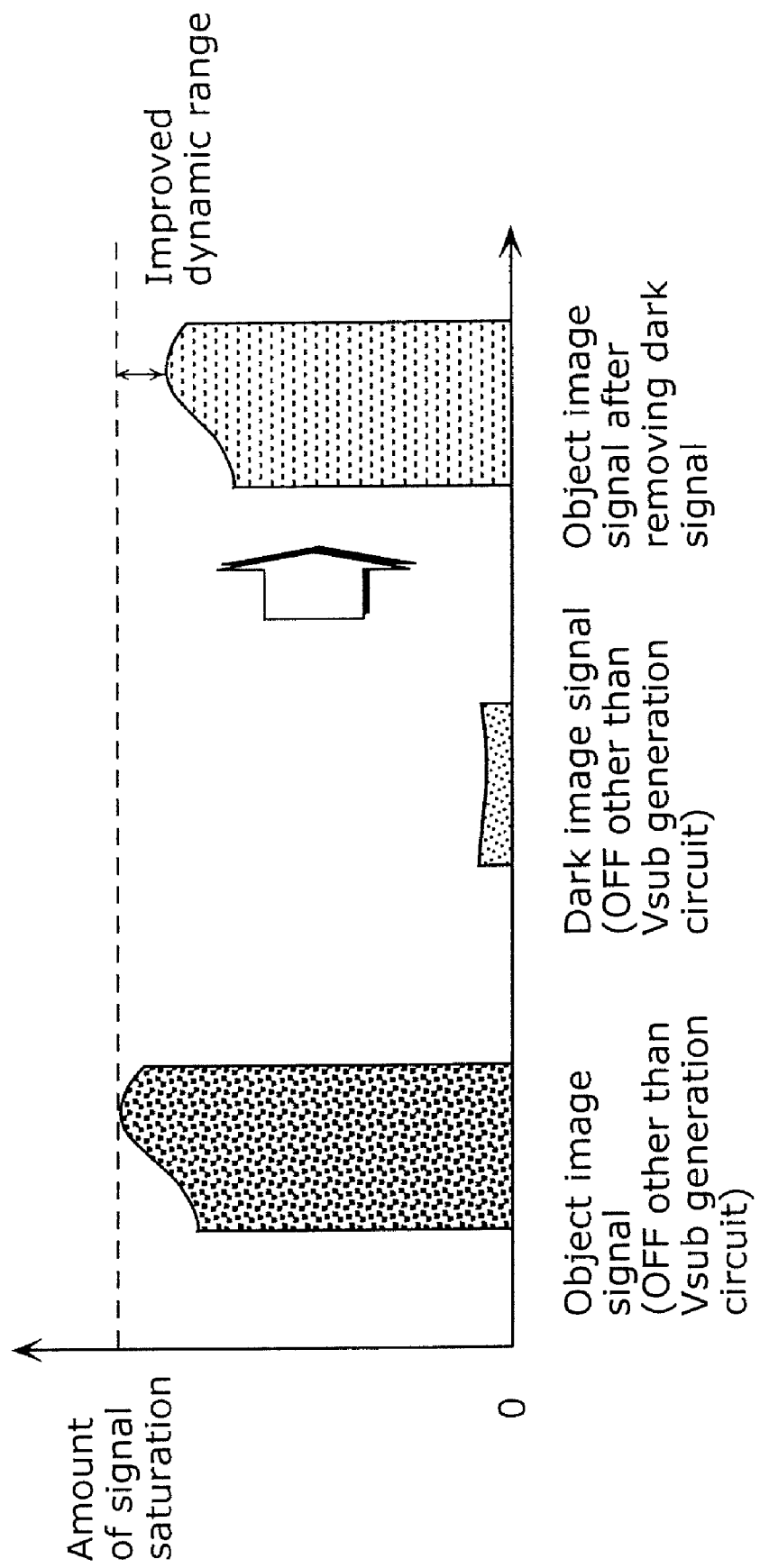
FIG. 9 is a graph showing a change in an amount of signal in the case where dark outputs are compensated with the driving method for solid-state imaging device and the solid-state imaging device according to Embodiment 1 of the present invention.

FIG. 9 is a graph showing a change in an amount of signal in the case where dark outputs are compensated with a driving method for solid-state imaging device according to Embodiment 1 of the present invention. Since the dark outputs due to the peripheral circuitry are reduced more than before, dark outputs are less generated even when the long exposure is performed, and the amount of signal saturation of the solid-state image sensor can be effectively used, thereby obtaining an image having a high dynamic range.

As described above, the driving method for solid-state imaging device according to the present embodiment includes: imaging an object for a first storage time in a period when a shutter is open, in a first state where either at least a part of a peripheral circuitry is suspended or a consumption current of the peripheral circuitry is limited; reading a signal image of the imaged object in a second state where neither the peripheral circuitry is suspended nor the consumption current of the peripheral circuitry is limited; imaging a dark output signal image including only a dark output for a second storage time in a period when the shutter is closed, in the first state; reading the imaged dark output signal image in the second state; converting the dark output signal image to correspond to the image obtained for the first storage time and subtracting, from the signal image of the object, the converted dark output signal image or converting the dark output signal image to correspond to the image obtained for the second storage time and subtracting, from the signal image of the object, the converted dark output signal image.

Since this suppresses the dark outputs generated in the peripheral circuitry at the time of imaging the object and the dark outputs due to emission of light by especially the DAHCs, an amount of compensation of the dark outputs is less than before. Thus, it is possible to reduce deterioration in image quality caused by the compensation of the dark outputs due to the peripheral circuitry more than before.

Furthermore, since the dark outputs generated in the peripheral circuitry at the time of imaging are suppressed in the present embodiment, an amount of compensation of the dark outputs is less than before. Therefore, it is possible to reduce the deterioration in image quality caused by the compensation errors of the dark outputs more than before.

It is to be noted that although the case where the dark output image is obtained after the desired imaging is performed has been described in the present invention, it is obvious that the same effect can be obtained by either obtaining the dark output image in prior to the desired imaging or performing the both.

Moreover, it is clear from the above-mentioned reasons that the present embodiment is particularly effective in a case of using the solid-state image sensor that includes the silicon substrate having a thickness of no more than 500 nm and has a high probability that the photons generated in the peripheral circuitry reflect at the back side of the substrate and are received by the photodiodes.

Embodiment 2

The following will describe a driving method for solid-state imaging device according to Embodiment 2 of the present invention with reference to the drawings.

Figure 10:
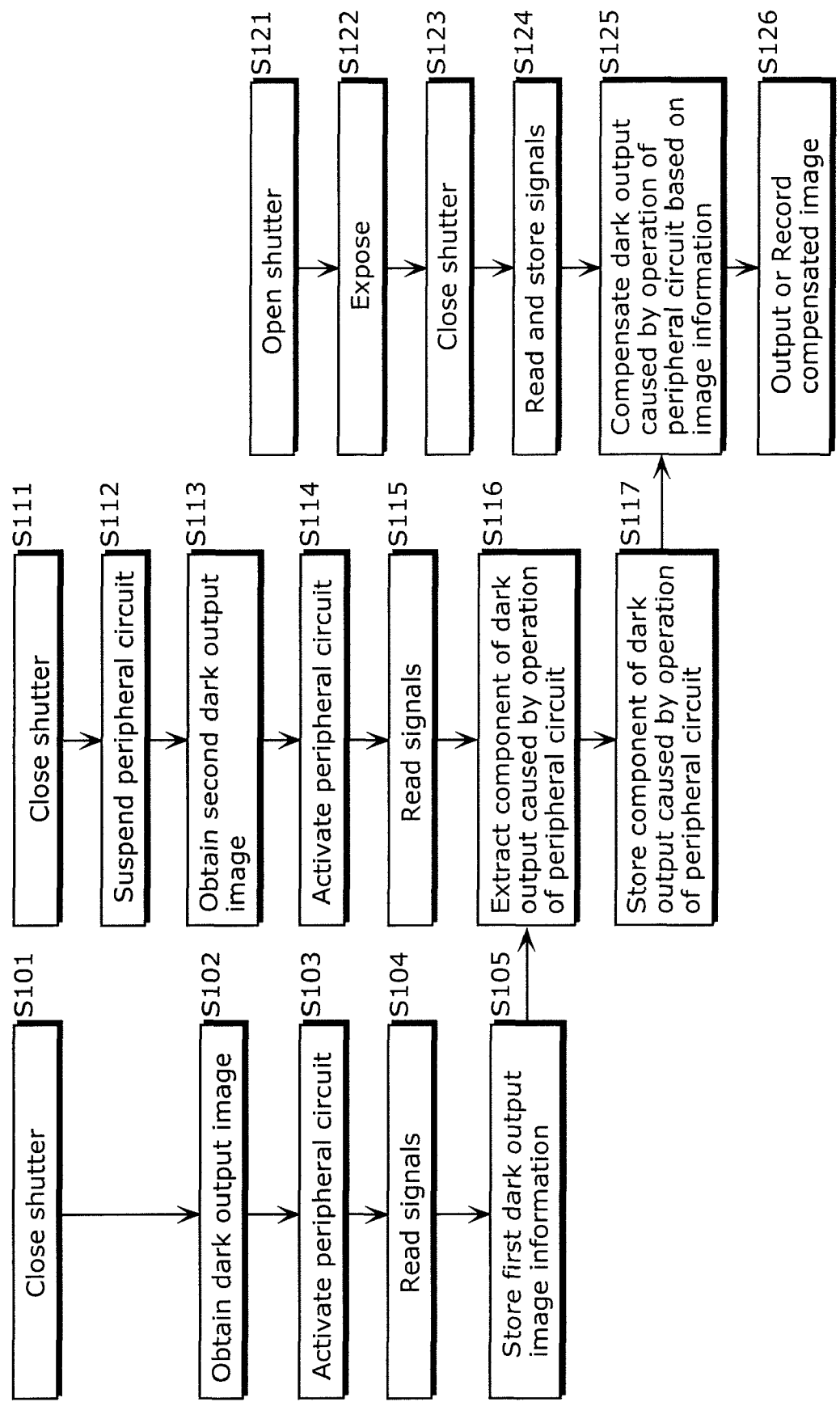
FIG. 10 is a diagram showing a driving method for solid-state imaging device according to Embodiment 2.

FIG. 10 is a diagram showing the driving method for solid-state imaging device according to the present invention.

The present embodiment provides a different driving method for use in the solid-state imaging device shown in FIG. 6 in Embodiment 1.

In the driving method for solid-state imaging device according to the present embodiment, a dark output image due to an operation of a peripheral circuitry is extracted and stored in a solid-state imaging device in advance according to the following procedure. In other words, the procedure is performed as follows. The peripheral circuitry is first activated as usual. Next, a shutter is closed (S101), and a first dark output image is obtained through signal accumulation for a certain period in a light-shielded state (S102). The peripheral circuitry is subsequently activated (S103). Then, signals are read (S104), and the signals are stored in a storage unit as the first dark output image (S105). The first dark output image includes both components of dark outputs due to DAHCs of the peripheral circuit and a thermal dark current generated in pixels such as photodiodes. Next, a part of the peripheral circuitry having no influence on exposure is suspended (S112), and a second dark output image is obtained through signal accumulation for a certain period (S113) in the light-shielded state where the shutter is closed (S111). Next, the peripheral circuitry is activated (S114), and the obtained second dark output image is read (S115). The second dark output image includes only components of the thermal dark current generated in the pixels such as the photodiodes. A dark output image due to the DAHCs of the peripheral circuitry is extracted by comparing the second dark output image and the previously stored first dark output image (S116). Needless to say, it would be possible to extract, through storage time conversion, images more accurately when each of storage times at which one of the images is obtained is preferably long and identical than when storage times at which the images are obtained are different from one another. The dark output image due to the peripheral circuitry extracted in this manner is stored with storage time information at the time of imaging in a storage device (S117). Up to this point is a preliminary processing for imaging an object.

The shutter is opened (S121). Next, exposure of the object, that is, imaging is performed as usual with the peripheral circuitry operating as usual (S122). Then, the shutter is closed (S123), and signals are read and stored in the storage unit (S124). Compensation of the dark outputs is performed on the image imaged as usual through comparison operation on the image and the previously extracted and stored dark output image in consideration of respective exposure times of the image and the dark output image (S125). For example, when a dark output image is obtained for a storage time of 30 seconds and imaging is performed for an exposure time of 10 seconds, a difference with the imaged image is determined by multiplying an amount of signal of the dark output image with ⅓. A final image obtained in this manner is outputted or recorded (S126).

In Embodiment 1, since a dark output image is obtained every time imaging is performed, there is a problem that an effective time required for the imaging becomes longer. In the present embodiment, only the components of the dark outputs due to the peripheral circuitry are extracted and stored in advance.

Figure 11:
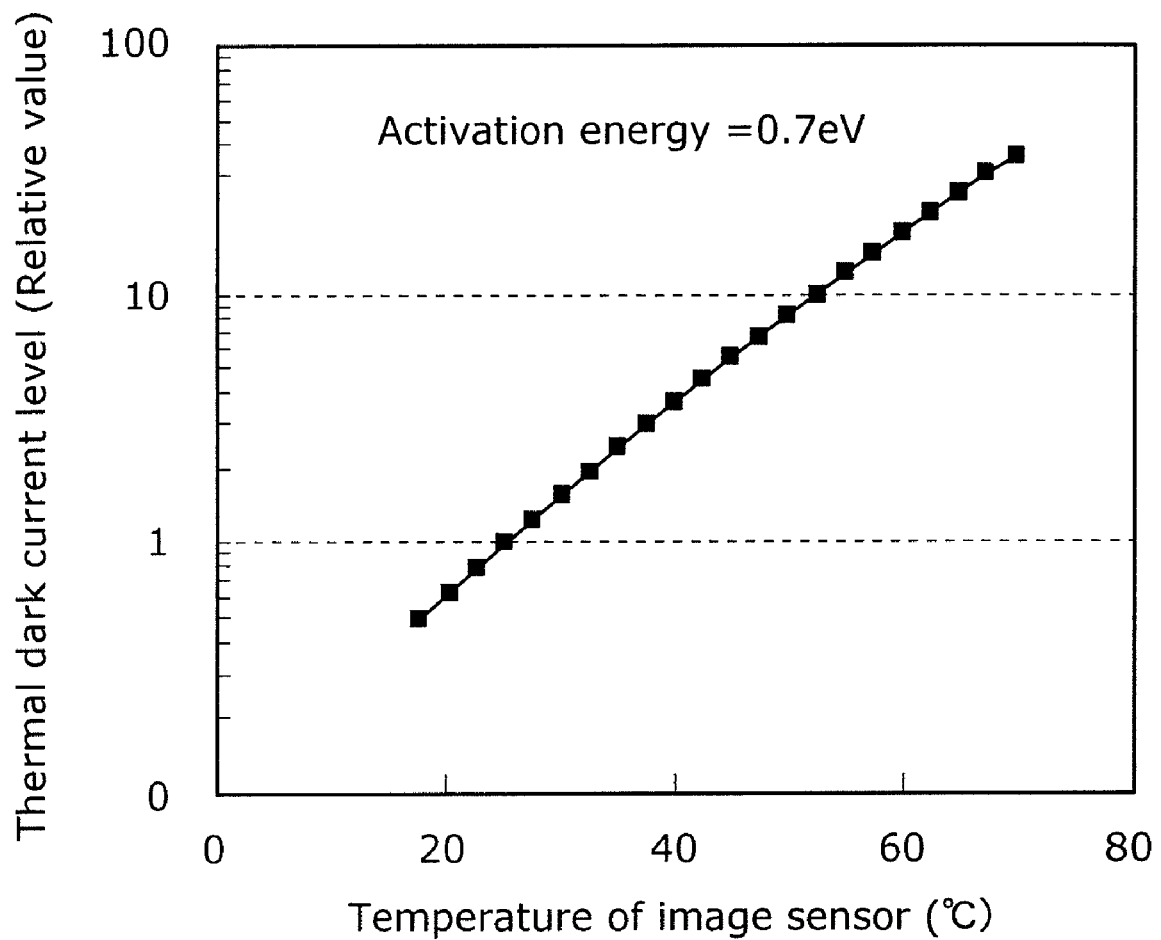
FIG. 11 is a diagram showing temperature dependence of components of a thermal dark current generated in pixels such as photodiodes.

FIG. 11 is a diagram showing temperature dependence of components of a thermal dark current generated in pixels such as photodiodes. In the case where activation energy is 0.7 eV, a relative value is shown with 1 as a value at room temperature. In this case, a dark output is approximately eight-fold per 10° C. rise in temperature. As stated above, the thermal dark current components of the solid-state image sensor are very sensitive to the temperature.

Figure 12:
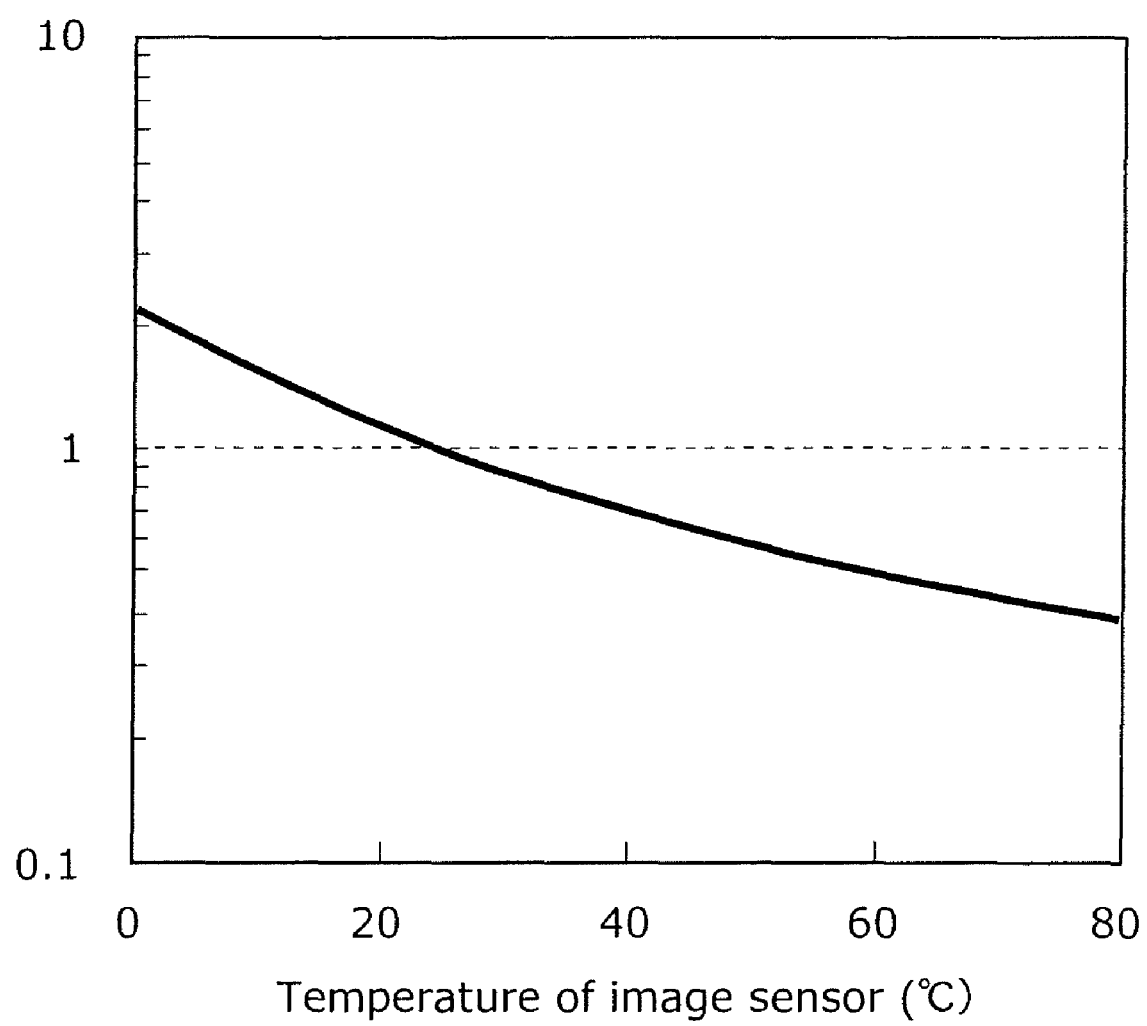
FIG. 12 is a diagram showing temperature dependence of dark outputs due to DAHCs generated in a peripheral circuitry on a solid-state image sensor.

FIG. 12 is a diagram showing temperature dependence of dark outputs due to DAHCs generated in a peripheral circuitry on a solid-state image sensor. A relative value is shown with 1 as a value at room temperature. Although, since energy of hot carriers increases with a lower temperature at which lattice vibration of a crystal becomes small, the dark outputs due to the DAHCs also increase with the lower temperature, temperature dependence of the energy is approximately ¹⁄₁₀ in comparison with the thermal current components. In an environment where a temperature is approximately between 0° C. and 30° C., the temperature of the solid-state image sensor in the solid-state imaging device varies approximately from 10° C. to 60° C.

Since the dark output image previously stored using the conventional method includes the thermal dark current components, even when performing compensation of an imaged image is attempted, the compensation is inaccurate because of a change in respective temperatures at the time of obtaining the dark output image and at the time of imaging. As a result, the image fidelity is deteriorated. Thus, it has been necessary to obtain a dark output image every time imaging is performed. Since only the dark outputs due to the DAHCs of the peripheral circuitry and having small temperature dependence can be compensated in the present embodiment, it is possible to attempt shortening an effective imaging time while maintaining a certain effect of the compensation.

As described above, a driving method for solid-state imaging device according to the present embodiment includes: imaging a first dark output signal image including only a dark output for a first storage time in a period when a shutter is closed, in a first state where either at least a part of a peripheral circuitry is suspended or a consumption current of the peripheral circuitry is limited; reading the imaged first dark output signal image in a second state where neither the peripheral circuit is suspended nor the consumption current of the peripheral circuitry is limited; reading a second dark output signal image that includes only a dark output and is imaged for a second storage time in a period when the shutter is closed, in the second state; generating a third dark output signal image by subtracting, from the second dark output signal image, the first dark output signal image that has been converted to correspond to the second dark output signal image obtained for the second storage time; imaging an object for a third storage time in a period when the shutter is open, in the second state, and reading a signal image of the object; and converting the third dark output signal image to correspond to the signal image obtained for the third storage time and subtracting, from the signal image of the object, the converted third dark output signal image.

Accordingly, since only the dark outputs due to the DAHCs of the peripheral circuitry and having the small temperature dependence can be compensated, it is possible to attempt shortening the effective imaging time (that is, elimination of an imaging-restricted period) while maintaining the certain effect of the compensation. This is because, as the third dark output signal image is an image indicating only the dark output components due to the DAHCs, the third dark output signal image can be prepared in advance before an imaging time of an object.

It is to be noted that it is clear from the reasons described in Embodiment 1 that the present embodiment is particularly effective in a case of using the solid-state image sensor that includes the substrate having a thickness of no more than 500 nm and has a high probability that the photons generated in the peripheral circuitry on the solid-state image sensor reflect at the back side of the substrate and are received by the photodiodes.

Embodiment 3

The following will describe a driving method for solid-state imaging device and a solid-state imaging device according to Embodiment 3 of the present invention with reference to the drawings.

Figure 13:
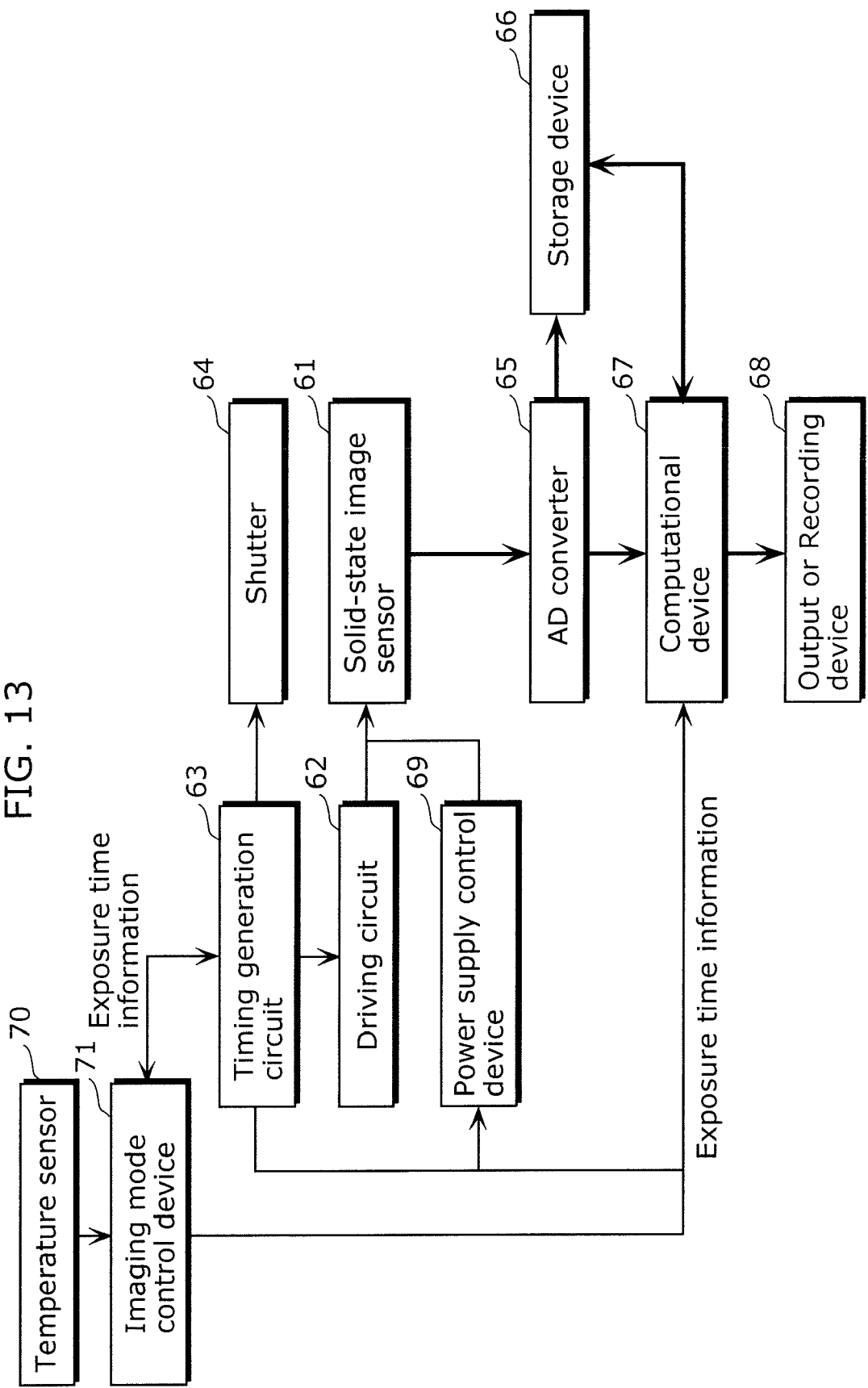
FIG. 13 is a diagram showing a solid-state imaging device according to Embodiment 3.

FIG. 13 is a diagram showing the solid-state imaging device according to the present embodiment. The solid-state imaging device according to the present embodiment differs from the solid-state imaging device according to Embodiment 1 shown in FIG. 6 in including a temperature sensor 70 and an imaging mode control device 71.

Figure 14:
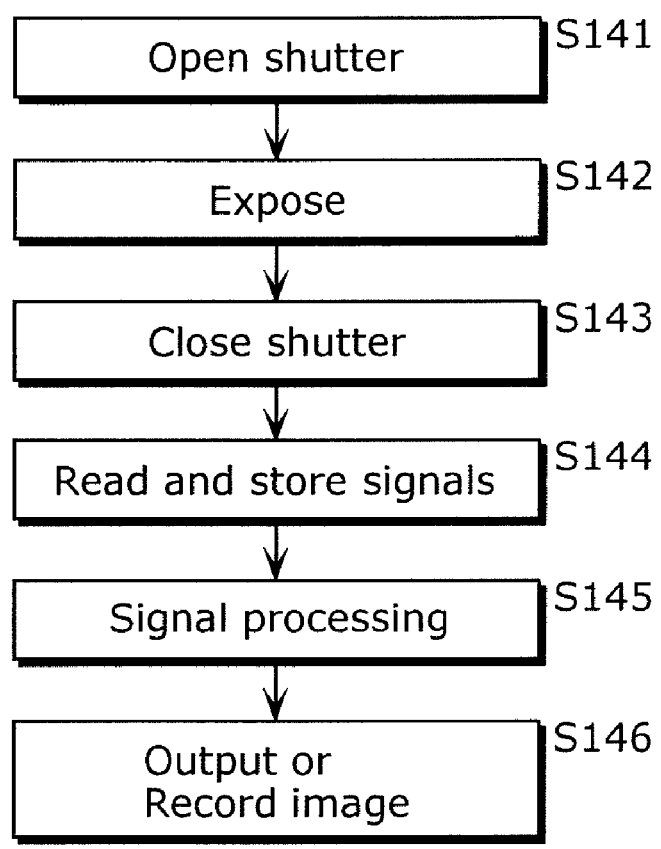
FIG. 14 is a diagram showing a conventional driving method for solid-state imaging device with which dark outputs are not compensated.

FIG. 14 is a diagram showing a conventional driving method for solid-state imaging device. This conventional method (S141 to S146) in which a peripheral circuitry is not suspended and dark outputs are not compensated is called an imaging mode 4. Since the peripheral circuitry is not switched on and off in this mode, the mode is suitable for continuous imaging or a condition where the dark outputs are not high.

Figure 15:
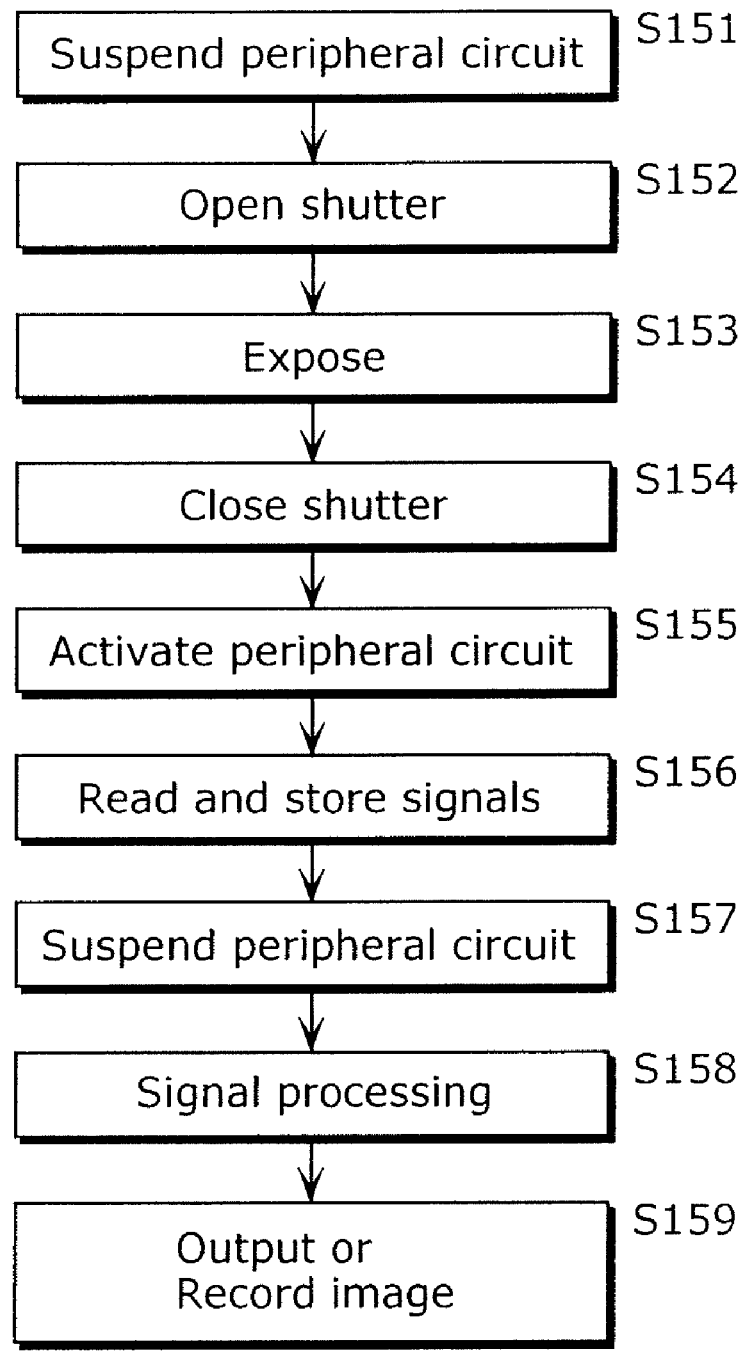
FIG. 15 is a diagram showing a driving method for solid-state imaging device according to Embodiment 3.

FIG. 15 is a diagram showing the driving method for solid-state imaging device according to the present embodiment.

First, a peripheral circuitry having no influence on exposure is suspended (S151). Next, a shutter is opened (S152), and the exposure of an object, that is, imaging is performed (S153). The shutter is subsequently closed (S154). Next, the peripheral circuitry is activated again (S155), and signals obtained through the imaging are read (S156). Then, the peripheral circuitry is suspended (S157), and an image is outputted or recorded (S159) after signal processing (S158). Although image information obtained in the above manner includes relatively uniform dark outputs generated by heat, the image information does not include local dark outputs due to an operation of the peripheral circuitry. Necessary signal processing is performed on the image information, and then the image information is outputted or recorded.

In the driving method for solid-state imaging device, although dark outputs are not generated in a peripheral circuitry suspended during imaging, it is not possible to compensate thermal dark current components generated in pixels such as photodiodes and dark output components due to the operation of the peripheral circuitry necessary for imaging such as a substrate voltage generation circuit. Put it differently, a good image cannot be obtained in the case where the dark outputs due to the heat are high because a temperature of the solid-state image sensor is high or the dark outputs due to the peripheral circuitry necessary for imaging such as the substrate voltage generation circuit cannot be ignored because an exposure time is very long. On the other hand, as with the driving method for solid-state imaging device according to Embodiments 1 and 2, there is no need to worry about the deterioration in image quality caused by compensation errors because unnecessary processing in which dark outputs are compensated based on an imaged image is not performed, and a signal processing time can be also shortened. This driving method for solid-state imaging device is called an imaging mode 3.

The imaging mode 3 is the driving method for solid-state imaging device most suitable for a case where neither the temperature of the solid-state image sensor is high nor the exposure time is long.

Further, the driving method for solid-state imaging device that has been described in Embodiment 2 and shown in FIG. 10 is called an imaging mode 2.

Likewise, the driving method for solid-state imaging device that has been described in Embodiment 1 and shown in FIG. 8 is called an imaging mode 1.

Table 1 shows characteristics of each imaging mode. It is obvious from the above description that the compensation effect of the dark outputs and the image fidelity increase in descending order of the imaging modes 4.

On the other hand, it is also clear from the above description that, based on whether or not dark outputs due to the peripheral circuitry of the solid-state image sensor that are generated at the time of imaging are present, dynamic ranges of images are the same for the imaging modes 1 and 3 and for the imaging modes 2 and 4, respectively, and the dynamic ranges of the images are improved with the imaging modes 1 and 3 but not with the imaging modes 2 and 4.

TABLE 1

|  | Imaging mode 1 | Imaging mode 2 | Imaging mode 3 | Imaging mode 4 |
| --- | --- | --- | --- | --- |
| Thermal dark current compensation effect | Yes | No | No | No |
| Compensation effect due to circuit | Yes | Yes | Partially yes | No |
| Effective imaging time | Longest | Compensation time necessary Switching circuit on and off necessary | Compensation time necessary Switching circuit on and off necessary | Shortest |
| Deteriorated dynamic range due to dark output | Improve | Not improve | Improve | Not improve |

The solid-state imaging device according to the present embodiment has a function to switch between the imaging modes 1 to 4 of the driving method for solid-state imaging device.

Figure 16:
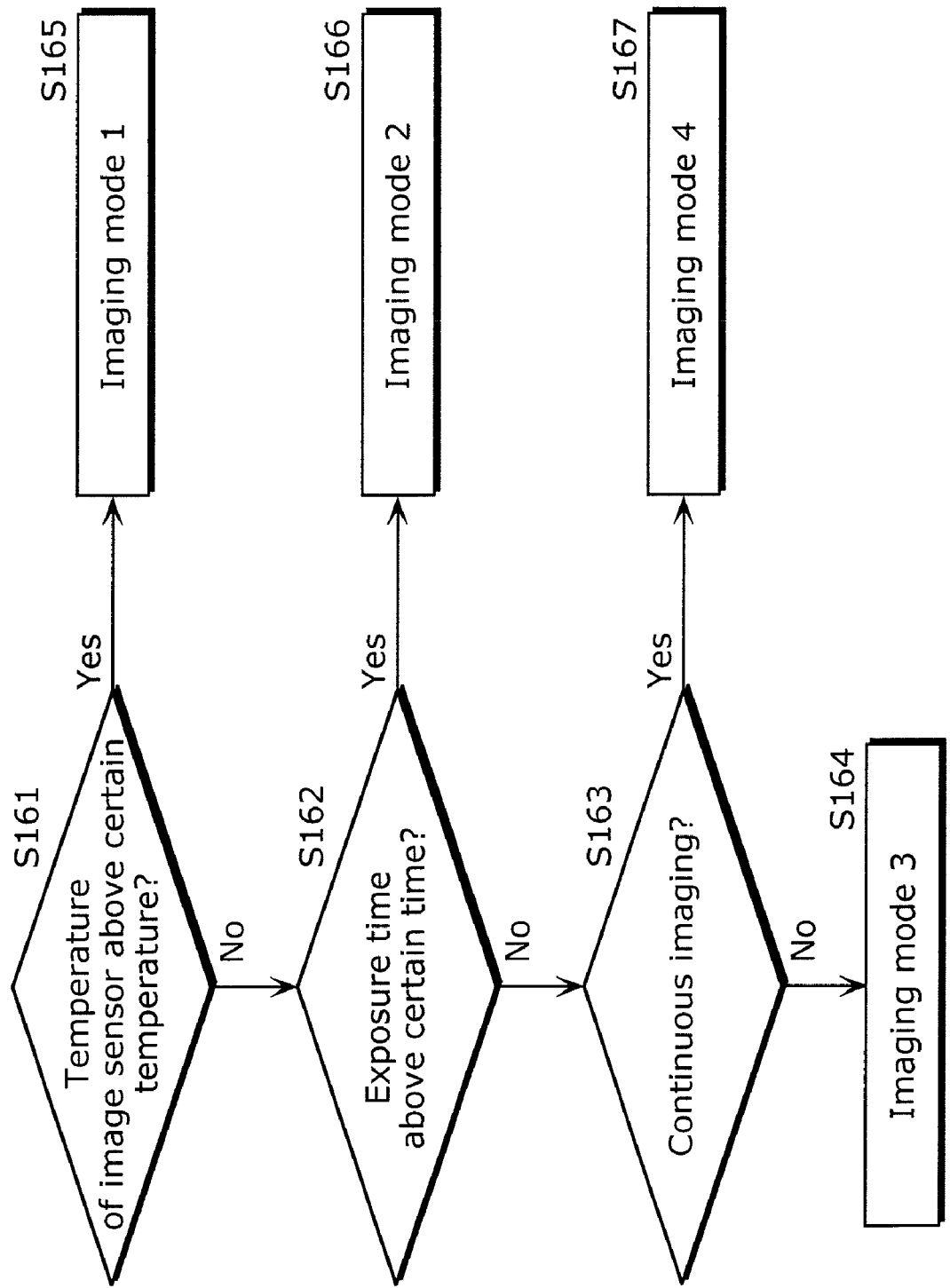
FIG. 16 is a diagram showing an example of an imaging mode selection algorithm according to Embodiment 3 in which fidelity is prioritized.

FIG. 16 is a diagram showing an example of an imaging mode selection algorithm according to present embodiment in which fidelity is prioritized. In the figure, when a temperature of the solid-sate image sensor is above a predetermined value (S161), an imaging mode is set to the imaging mode 1 (S165), and when the temperature of the solid-sate image sensor is below the predetermined value and an exposure time is above a predetermined certain time (S162), the imaging mode is set to the imaging mode 2 (S166). Further, when the exposure time is below the predetermined certain time and continuous imaging is performed (S163), the imaging mode is set to the imaging mode 4 (S167), and when the continuous imaging is not performed, the imaging mode is set to the imaging mode 3 (S164).

Figure 17:
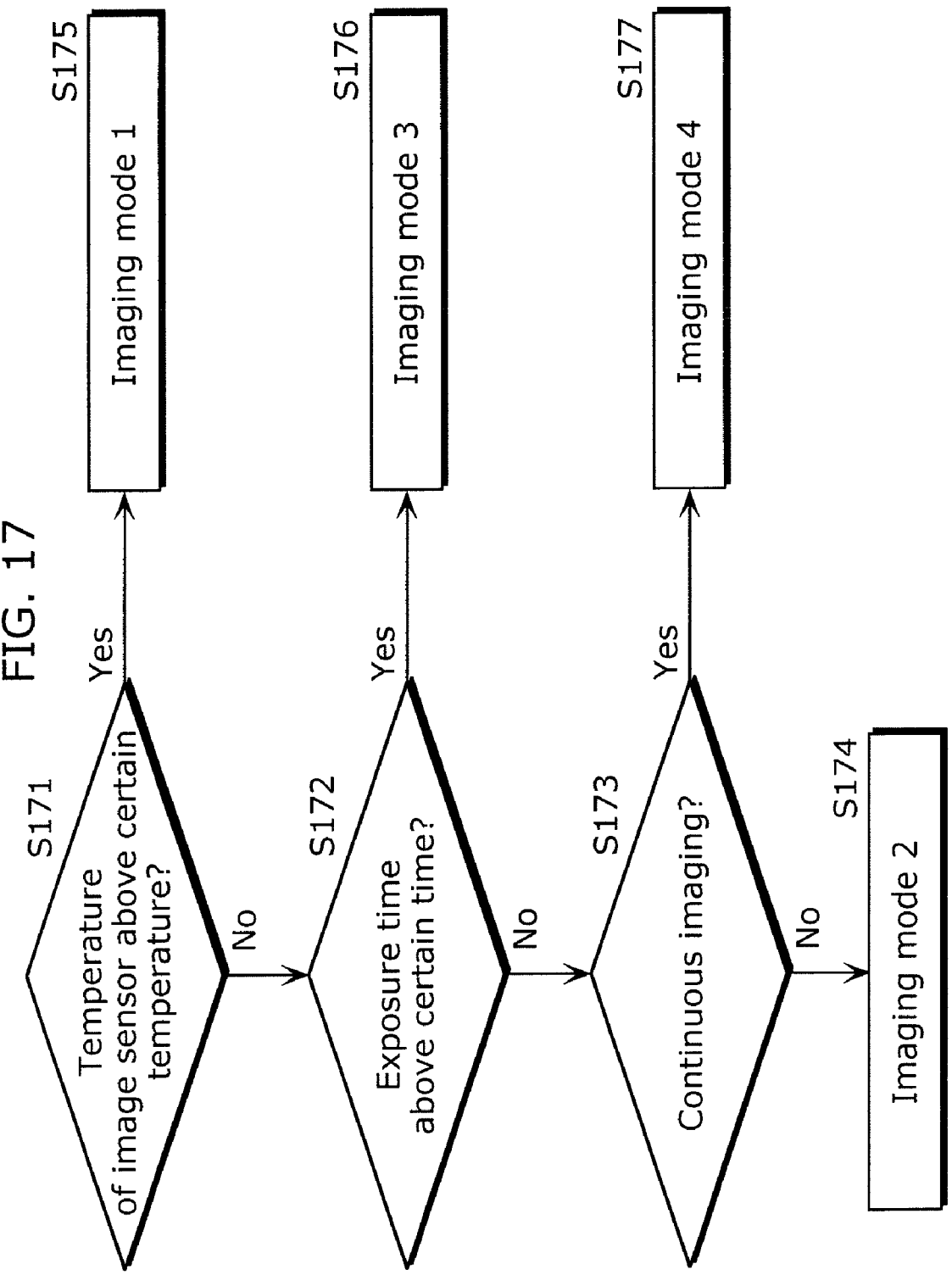
FIG. 17 is a diagram showing an example of an imaging mode selection algorithm according to Embodiment 3 in which a dynamic range is prioritized.

FIG. 17 is a diagram showing an example of an imaging mode selection algorithm according to the present embodiment in which a dynamic range is prioritized. Consequently, the figure differs from FIG. 16 in that the imaging mode is set to the imaging mode 2 instead of the imaging mode 3 (S174).

Figure 18:
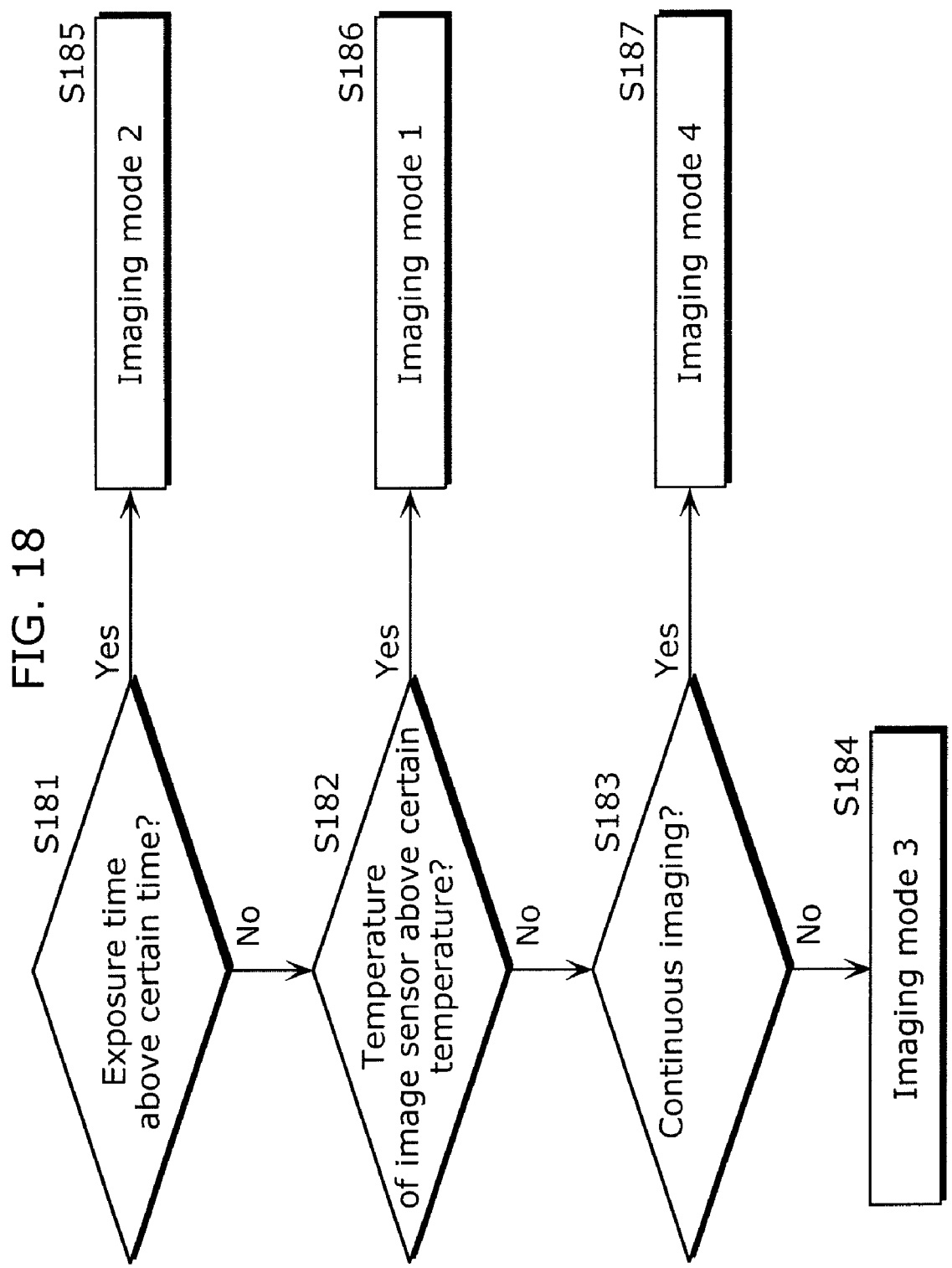
FIG. 18 is a diagram showing an example of an imaging mode selection algorithm according to Embodiment 3 in which an effective imaging time is prioritized.

FIG. 18 is a diagram showing an example of an imaging mode selection algorithm according to present embodiment in which an effective imaging time is prioritized. Accordingly, the figure differs from FIG. 16 in that the imaging mode is set to the imaging mode 2 instead of the imaging mode 1 (S185), that the imaging mode is set to the imaging mode 1 instead of the imaging mode 2 (S186), and that an order in which the exposure time and the temperature are determined is changed (S181 and S182).

The solid-state imaging device according to the present embodiment detects, with the temperature sensor 70, a temperature of the solid-state image sensor or a periphery of the solid-state image sensor; determines, based on an exposure time predicted from an illuminance of an object and whether or not continuous imaging is performed, an imaging mode with the imaging code control device 71 comprehensively judging a fidelity of image quality depending on a size of a compensation effect of dark outputs and respective algorithms shown in FIG. 16, FIG. 17, or FIG. 18 in which the dynamic range is improved through suppression of the dark outputs generated at the time of imaging; and performs imaging.

With such method for solid-state imaging device and a solid-state imaging device, it is possible to perform imaging using the driving method for solid-state imaging device always suitable for the influence of the dark outputs caused by conditions or an environment of the solid-state imaging device and an exposure time.

It is to be noted that although the example where the imaging modes 1 to 4 are automatically selected based on the algorithms included in the imaging mode control device 71 has been described in the present embodiment, the algorithms may be switched between depending on brightness and contrast of an object, and an imaging mode may be selected by a person imaging.

It is to be noted that although the imaging modes 1 to 4 are options for an imaging mode in the present embodiment, even a function with which two or three types of imaging modes including the imaging mode 1, 2, or 3 are switched between can produce the effect of the present embodiment.

As with Embodiments 1 and 2, the present embodiment of the present invention is particularly effective in a case of using the solid-state image sensor that includes the substrate having a thickness of no more than 500 nm and has a high probability that the photons generated in the peripheral circuitry reflect at the back side of the substrate and are received by the photodiodes.

Although the driving method for solid-state imaging device and the solid-state imaging device according to the present invention has been described based on Embodiments 1 to 3, the present invention is not limited to these embodiments. The present invention includes other embodiments made by combining any components in each of the embodiments, modifications obtained by modifying each embodiment without materially departing from the novel teachings and advantages of the present invention, and a variety of devices including the solid-state image sensor according to the present invention.

Figure 19A:
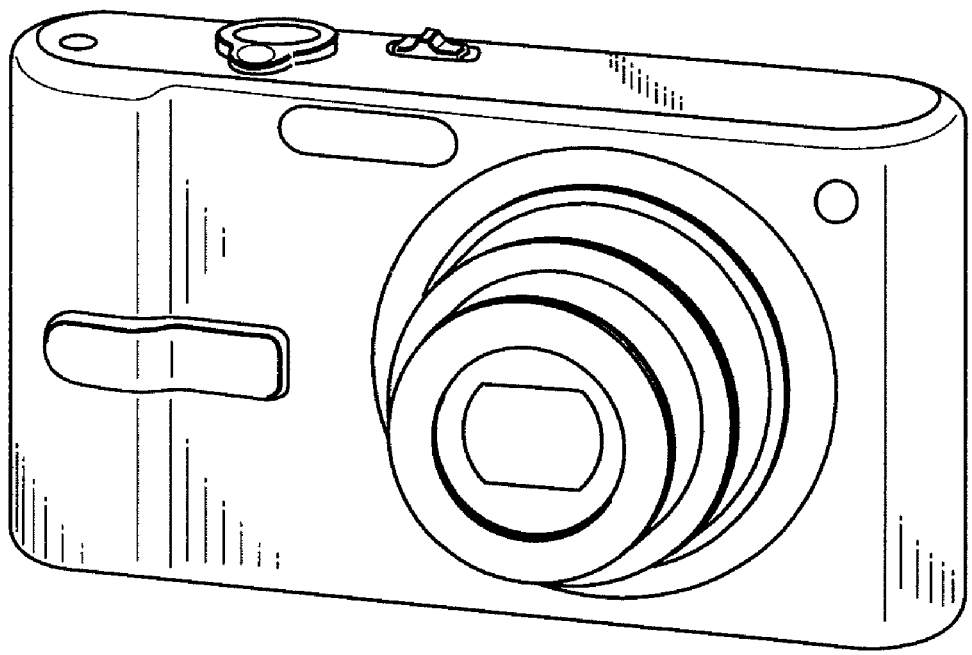
FIG. 19 is a schematic view of a camera.
Figure 19B:
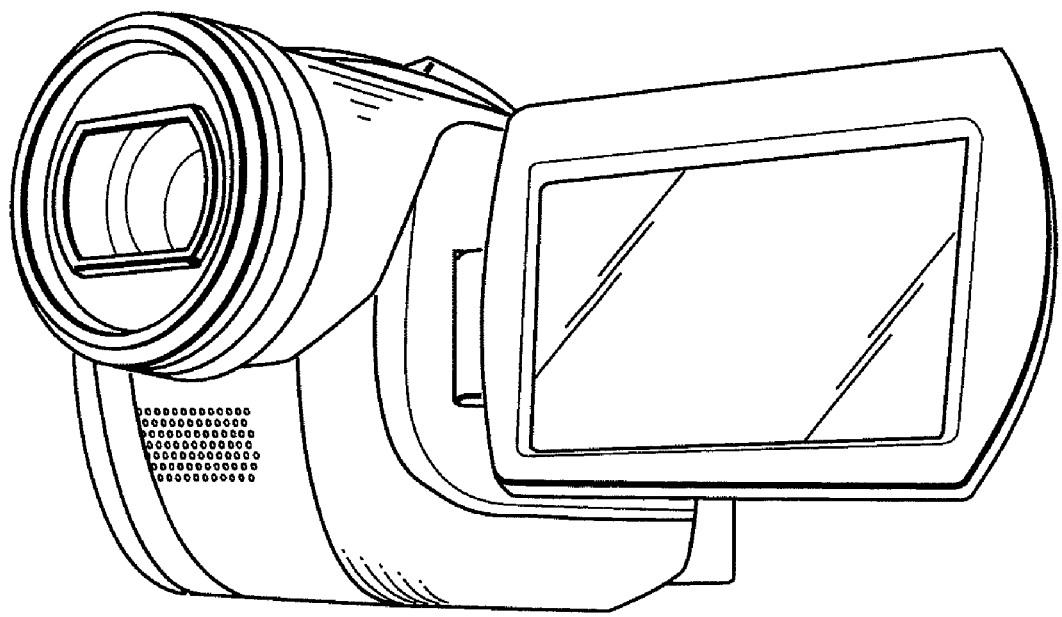
Figure 20:
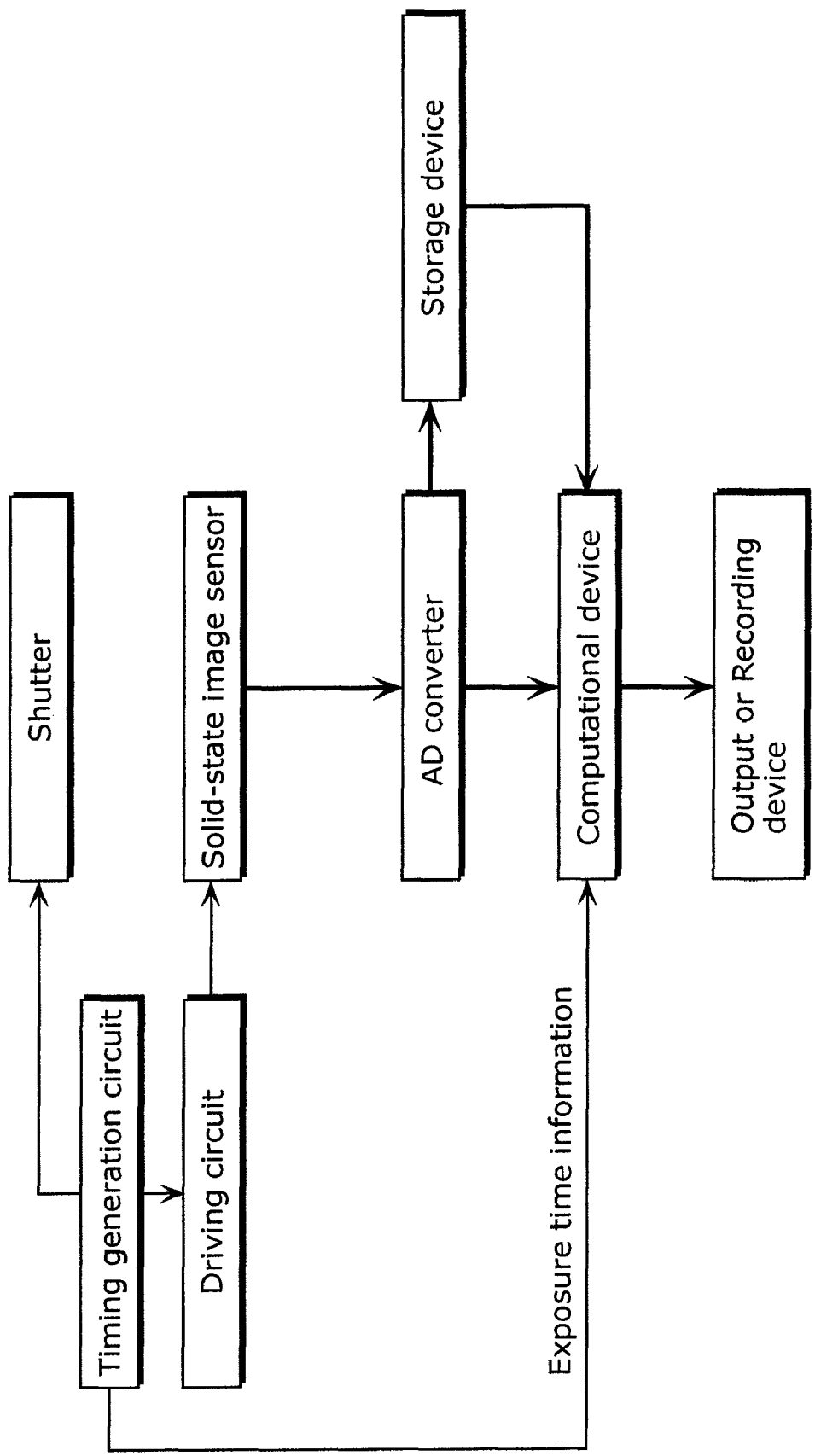
FIG. 20 is a diagram showing a configuration of a conventional solid-state imaging device.
Figure 21:
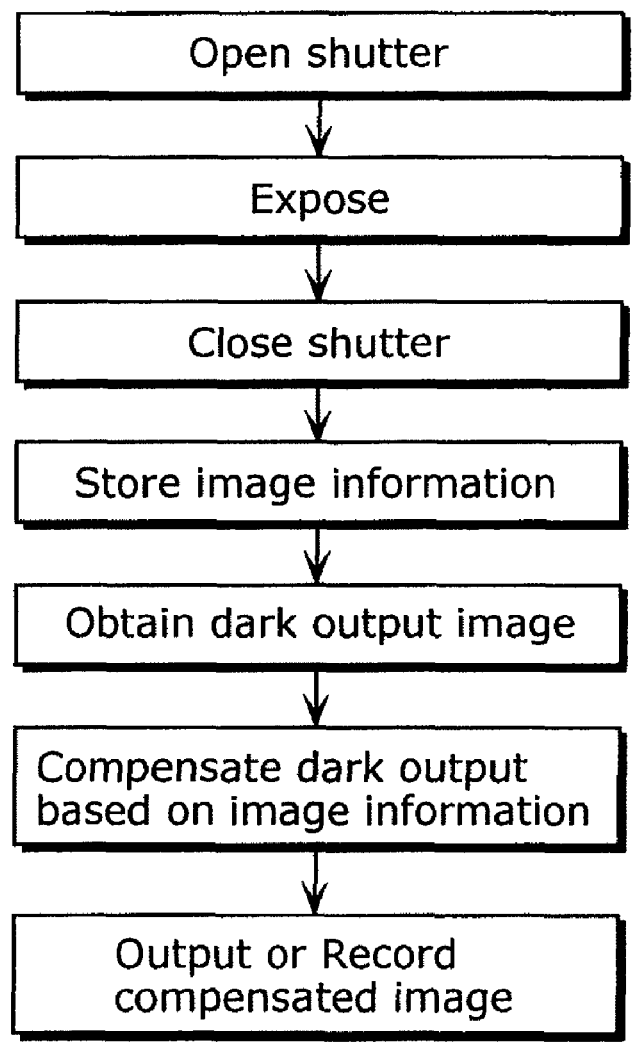
FIG. 21 is a diagram showing a simplified conventional driving method for solid-state imaging device.

For example, the present invention is embodied as a digital still camera and a video camera shown in FIG. 19. The digital still camera and the video camera include the solid-state imaging device shown in FIGS. 6 and 13, and reduce the deterioration in image quality by suppressing the dark outputs due to the emission of light by the DAHCs.

INDUSTRIAL APPLICABILITY

The present invention can be applied to driving methods for solid-state imaging device, and is especially useful in performing imaging for high image quality and fidelity.

What is claimed is:

1. A driving method for use in a solid-state imaging device that includes a solid-state image sensor including an imaging region and a peripheral circuitry arranged around the imaging region, said driving method comprising:
    imaging an object for a first storage time in a period when a shutter is open, in a first state that is a state where either at least a part of the peripheral circuitry is suspended or a consumption current of the peripheral circuitry is limited;
    reading a signal image of the imaged object in a second state that is a state where the peripheral circuitry is not suspended and the consumption current is not limited;
    imaging, in the first state, a dark output signal image including only a dark output for a second storage time in a period when the shutter is closed;
    reading the imaged dark output signal image in the second state; and
    converting the dark output signal image to correspond to the image obtained for the first storage time and subtracting, from the signal image of the object, the converted dark output signal image or converting the dark output signal image to correspond to the image obtained for the second storage time and subtracting, from the signal image of the object, the converted dark output signal image.

2. The driving method according to claim 1, wherein a substrate of the solid-state image sensor has a thickness of no more than 500 μm.

3. The driving method according to claim 1, wherein the solid-state imaging device includes a temperature sensor that detects a temperature of either the solid-state image sensor or a periphery of the solid-state image sensor, and
said driving method further comprises
determining an imaging mode for imaging the object based on the temperature detected by the temperature sensor.

4. The driving method according to claim 1, wherein the solid-state image sensor is a CCD solid-state image sensor, and the peripheral circuitry is an output amplifier.

5. The driving method according to claim 1, wherein the solid-state image sensor is a CCD solid-state image sensor, and the peripheral circuitry is either a substrate voltage generation circuit or a part of the substrate voltage generation circuit.

6. The driving method according to claim 1, wherein the solid-state image sensor is a MOS solid-state image sensor, and the peripheral circuitry is a column amplifier.

7. The driving method according to claim 1, wherein the solid-state image sensor is a MOS solid-state image sensor, and the peripheral circuitry is an AD conversion circuit.

8. The driving method according to claim 1, wherein the solid-state image sensor is a MOS solid-state image sensor, and the peripheral circuitry is at least one of a vertical shift register and a horizontal shift register.

9. A driving method for use in a solid-state imaging device that includes a solid-state image sensor including an imaging region and a peripheral circuitry arranged around the imaging region, said driving method comprising:
    imaging a first dark output signal image including only a dark output for a first storage time in a period when a shutter is closed, in a first state that is a state where either at least a part of the peripheral circuitry is suspended or a consumption current of the peripheral circuitry is limited;
    reading the imaged first dark output signal image in a second state that is a state where the peripheral circuitry is not suspended and the consumption current is not limited;
    reading, in the second state, a second dark output signal image that includes only a dark output and is imaged for a second storage time in a period when the shutter is closed;
    generating a third dark output signal image by converting the first dark output signal image to correspond to the second dark output signal image obtained for the second storage time and by subtracting, from the second dark output signal image, the converted the first dark output signal image;
    imaging, in the second state, an object for a third storage time in a period when the shutter is open, and reading a signal image of the object; and
    converting the third dark output signal image to correspond to the signal image obtained for the third storage time, and subtracting, from the signal image of the object, the converted third dark output signal image.

10. The driving method according to claim 9, wherein the solid-state imaging device includes a temperature sensor that detects a temperature of either the solid-state image sensor or a periphery of the solid-state image sensor, and
said driving method further comprises determining an imaging mode for imaging the object based on the temperature detected by the temperature sensor.

11. The driving method according to claim 9, wherein the solid-state image sensor is a CCD solid-state image sensor, and the peripheral circuitry is an output amplifier.

12. The driving method according to claim 9, wherein the solid-state image sensor is a CCD solid-state image sensor, and the peripheral circuitry is either a substrate voltage generation circuit or a part of the substrate voltage generation circuit.

13. The driving method according to claim 9, wherein the solid-state image sensor is a MOS solid-state image sensor, and the peripheral circuitry is a column amplifier.

14. The driving method according to claim 9,
wherein the solid-state image sensor is a MOS solid-state image sensor, and the peripheral circuitry is an AD conversion circuit.

15. The driving method according to claim 9,
wherein the solid-state image sensor is a MOS solid-state image sensor, and the peripheral circuitry is at least one of a vertical shift register and a horizontal shift register.

16. A solid-state imaging device that includes an imaging region and a peripheral circuitry around the imaging region, said solid-state imaging device comprising:
- a solid-state image sensor that either externally suspends at least a part of the peripheral circuitry or limits a consumption current of the peripheral circuitry;
- a power supply control device that controls either the suspension of the peripheral circuitry or the limiting of the consumption current;
- a shutter that is used for imaging with the solid-state image sensor in a light-shielded state;
- a timing generating circuit that synchronizes the imaging with an operation of said power supply control device and said shutter;
- a storage device that temporarily stores imaging information obtained through the imaging; and
- a computation device that performs a comparison operation on image information of at least two images,
wherein said solid-state imaging device images an object for a first storage time in a period when said shutter is open, in a first state that is a state where either at least a part of the peripheral circuitry is suspended or a consumption current of the peripheral circuitry is limited; images a dark output signal image including only a dark output for a second storage time in a period when said shutter is closed, in the first state; and converts the dark output signal image to correspond to the imaged obtained for the first storage time and subtracts, from a signal image of the object, the converted dark output signal image or converts the dark output signal image to correspond to the image obtained for the second storage time, and subtracts, from a signal image of the object, the converted dark output signal image.

17. A camera comprising the solid-state imaging device according to claim 16.

* * * * *